US012502965B2

(12) United States Patent
Davis et al.

(10) Patent No.: US 12,502,965 B2
(45) Date of Patent: *Dec. 23, 2025

(54) REFUSE VEHICLE WITH ELECTRIC CHASSIS

(71) Applicant: Oshkosh Corporation, Oshkosh, WI (US)

(72) Inventors: Emily Davis, Rochester, MN (US); Joshua D. Rocholl, Rochester, MN (US); Clinton T. Weckwerth, Pine Island, MN (US); Vincent Hoover, Byron, MN (US); Michael R. Moore, New London, WI (US); Samuel Mueller, Oshkosh, WI (US); Jeff Verhagen, Oshkosh, WI (US); Jeremy Andringa, Oshkosh, WI (US); Greg Steffens, Oshkosh, WI (US); Jeffrey Koga, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,167

(22) Filed: Aug. 15, 2023

(65) Prior Publication Data

US 2023/0382228 A1    Nov. 30, 2023

Related U.S. Application Data

(63) Continuation of application No. 17/501,479, filed on Oct. 14, 2021, now Pat. No. 11,766,941.
(Continued)

(51) Int. Cl.
*B60L 1/00*    (2006.01)
*B60W 10/08*   (2006.01)
(Continued)

(52) U.S. Cl.
CPC ............. *B60L 1/003* (2013.01); *B60W 10/08* (2013.01); *B60W 10/30* (2013.01); *B65F 3/00* (2013.01); *B60L 2200/40* (2013.01)

(58) Field of Classification Search
CPC .. B60L 1/003; B60L 2200/40; B60L 2240/12; B60L 2240/26; B60L 2250/16;
(Continued)

(56) References Cited

U.S. PATENT DOCUMENTS 9,403,278 B1    8/2016  Van Kampen et al.
9,616,752 B2    4/2017  O'Donnell et al.
(Continued)

FOREIGN PATENT DOCUMENTS

CN    105564294 A  *  5/2016
CN    106044663 A  * 10/2016    .............. B66F 17/00
(Continued)

OTHER PUBLICATIONS

CN-111169871-A English Translation (Year: 2020).*
(Continued)

*Primary Examiner* — Michael T. Walsh
(74) *Attorney, Agent, or Firm* — Foley & Lardner LLP

(57) ABSTRACT

A refuse vehicle includes a chassis, an energy storage device supported by the chassis, a body assembly, and a power distribution unit. The energy storage device is configured to provide electrical power to a prime mover. Activation of the prime mover selectively drives the refuse vehicle. The body assembly is configured for storing refuse and is supported by the chassis. The power distribution unit is coupled to the energy storage device and is configured to control power transmission outward from the energy storage device. The body assembly includes a controller that communicates with the power distribution unit to adjust a flow of electrical power from the energy storage device to the body assembly.

14 Claims, 11 Drawing Sheets

Related U.S. Application Data

(60) Provisional application No. 63/147,406, filed on Feb. 9, 2021, provisional application No. 63/092,354, filed on Oct. 15, 2020.

(51) Int. Cl.
*B60W 10/30* (2006.01)
*B65F 3/00* (2006.01)

(58) Field of Classification Search
CPC ...... B60L 2250/20; B60L 50/62; B60L 50/66; B60L 2200/36; B60L 2250/24; B60W 10/08; B60W 10/30; B65F 3/00; B65F 2003/146; B65F 3/02; Y02T 10/70
See application file for complete search history.

(56) References Cited

U.S. PATENT DOCUMENTS

| | | | |
|---|---|---|---|
| 9,981,803 B2* | 5/2018 | Davis | B65F 3/28 |
| 10,065,627 B2* | 9/2018 | Oldridge | B60W 20/12 |
| 10,414,640 B2* | 9/2019 | Tanaka | B66F 9/24 |
| 10,618,409 B2* | 4/2020 | Gergis | B60K 25/02 |
| 10,812,976 B2* | 10/2020 | Ramic | H04W 12/06 |
| 11,603,265 B2* | 3/2023 | Williams | B65F 3/043 |
| 11,679,669 B2* | 6/2023 | Crist | B60K 15/03006 180/69.5 |
| 2005/0080520 A1* | 4/2005 | Kline | B65F 1/0006 701/1 |
| 2005/0109550 A1 | 5/2005 | Buglione et al. | |
| 2010/0145562 A1* | 6/2010 | Moran | F02N 11/0837 180/65.28 |
| 2017/0121108 A1 | 5/2017 | Davis et al. | |
| 2017/0275145 A1* | 9/2017 | Laker | B66F 9/07504 |
| 2018/0265289 A1 | 9/2018 | Davis et al. | |
| 2018/0319640 A1* | 11/2018 | Flenoid | G01S 17/08 |
| 2018/0343785 A1* | 12/2018 | Funk | A01B 59/00 |
| 2019/0091890 A1 | 3/2019 | Rocholl et al. | |
| 2019/0193934 A1 | 6/2019 | Rocholl et al. | |
| 2019/0322321 A1 | 10/2019 | Schwartz et al. | |
| 2019/0325220 A1 | 10/2019 | Wildgrube et al. | |
| 2019/0366956 A1 | 12/2019 | Kim | |
| 2020/0233410 A1* | 7/2020 | Burns | B60L 50/66 |
| 2020/0247609 A1* | 8/2020 | Maroney | B65F 3/04 |
| 2020/0262366 A1 | 8/2020 | Wildgrube et al. | |
| 2020/0342240 A1 | 10/2020 | Szoke-Sieswerda et al. | |
| 2020/0346547 A1* | 11/2020 | Rocholl | B65F 3/043 |
| 2020/0346556 A1 | 11/2020 | Rocholl et al. | |
| 2020/0346557 A1 | 11/2020 | Rocholl et al. | |
| 2020/0346657 A1 | 11/2020 | Clifton et al. | |
| 2020/0346854 A1 | 11/2020 | Rocholl et al. | |
| 2020/0346855 A1 | 11/2020 | Rocholl et al. | |
| 2020/0346856 A1 | 11/2020 | Rocholl et al. | |
| 2020/0346857 A1 | 11/2020 | Rocholl et al. | |
| 2020/0346858 A1 | 11/2020 | Buege et al. | |
| 2020/0346859 A1 | 11/2020 | Buege et al. | |
| 2020/0346860 A1 | 11/2020 | Buege et al. | |
| 2020/0346861 A1 | 11/2020 | Rocholl et al. | |
| 2020/0346862 A1 | 11/2020 | Rocholl et al. | |
| 2020/0347659 A1 | 11/2020 | Rocholl et al. | |
| 2020/0347661 A1 | 11/2020 | Rocholl et al. | |
| 2020/0348681 A1 | 11/2020 | Clifton et al. | |
| 2020/0348764 A1 | 11/2020 | Clifton et al. | |
| 2020/0398670 A1 | 12/2020 | Rocholl et al. | |
| 2020/0398695 A1 | 12/2020 | Rocholl et al. | |
| 2020/0398697 A1 | 12/2020 | Rocholl et al. | |
| 2020/0398772 A1 | 12/2020 | Wildgrube et al. | |
| 2020/0398857 A1 | 12/2020 | Clifton et al. | |
| 2020/0399057 A1 | 12/2020 | Rocholl et al. | |
| 2020/0399058 A1 | 12/2020 | Rocholl et al. | |
| 2021/0031611 A1 | 2/2021 | Yakes et al. | |
| 2021/0031612 A1 | 2/2021 | Yakes et al. | |
| 2021/0069934 A1 | 3/2021 | Rocholl et al. | |
| 2021/0221216 A1 | 7/2021 | Yakes et al. | |
| 2021/0229755 A1 | 7/2021 | Schwartz et al. | |
| 2021/0229908 A1 | 7/2021 | Rocholl et al. | |
| 2021/0252995 A1 | 8/2021 | Rocholl et al. | |
| 2021/0292086 A1 | 9/2021 | Mahan et al. | |
| 2021/0316740 A1 | 10/2021 | Clifton et al. | |
| 2021/0316741 A1 | 10/2021 | Clifton et al. | |
| 2021/0323436 A1 | 10/2021 | Rocholl et al. | |
| 2021/0323437 A1 | 10/2021 | Rocholl et al. | |
| 2021/0323438 A1 | 10/2021 | Rocholl et al. | |
| 2021/0323763 A1 | 10/2021 | Koga et al. | |
| 2021/0323764 A1 | 10/2021 | Koga et al. | |
| 2021/0323765 A1 | 10/2021 | Koga et al. | |
| 2021/0325529 A1 | 10/2021 | Koga et al. | |
| 2021/0325911 A1 | 10/2021 | Koga et al. | |
| 2021/0327164 A1 | 10/2021 | Koga et al. | |
| 2021/0327170 A1 | 10/2021 | Rocholl et al. | |
| 2021/0327237 A1 | 10/2021 | Rocholl et al. | |
| 2021/0331635 A1 | 10/2021 | Wildgrube et al. | |
| 2021/0331636 A1 | 10/2021 | Wildgrube et al. | |
| 2021/0331637 A1 | 10/2021 | Wildgrube et al. | |
| 2021/0339632 A1 | 11/2021 | Rocholl et al. | |
| 2021/0339648 A1 | 11/2021 | Koga et al. | |
| 2021/0339949 A1 | 11/2021 | Rocholl et al. | |
| 2021/0345062 A1 | 11/2021 | Koga et al. | |
| 2021/0373560 A1 | 12/2021 | Koga et al. | |
| 2022/0009338 A1 | 1/2022 | Yakes et al. | |
| 2022/0033181 A1 | 2/2022 | Koga et al. | |
| 2022/0096884 A1 | 3/2022 | Koga et al. | |
| 2022/0097527 A1 | 3/2022 | Koga et al. | |
| 2022/0097555 A1 | 3/2022 | Koga et al. | |
| 2022/0097556 A1 | 3/2022 | Koga et al. | |
| 2022/0097633 A1 | 3/2022 | Koga et al. | |
| 2022/0097961 A1 | 3/2022 | Koga et al. | |
| 2022/0097962 A1 | 3/2022 | Koga et al. | |
| 2022/0097963 A1 | 3/2022 | Koga et al. | |
| 2022/0097964 A1 | 3/2022 | Koga et al. | |
| 2022/0099723 A1 | 3/2022 | Koga et al. | |
| 2022/0118854 A1 | 4/2022 | Davis et al. | |
| 2022/0185582 A1 | 6/2022 | Koga et al. | |

FOREIGN PATENT DOCUMENTS

| | | | | |
|---|---|---|---|---|
| CN | 109353231 A | | 2/2019 | |
| CN | 111169871 A | * | 5/2020 | |
| EP | 1020375 A1 | * | 7/2000 | ............... B65F 3/04 |
| EP | 3483092 A1 | * | 5/2019 | ............... B65F 3/20 |
| ES | 2361363 A1 | * | 6/2011 | ............. B65F 3/041 |
| FR | 3043608 A1 | * | 5/2017 | .......... B60Q 1/0041 |
| JP | 2001238308 A | * | 8/2001 | |
| JP | 2019134603 A | * | 8/2019 | |
| TW | I453133 B | | 9/2014 | |
| WO | WO-2019/079883 A1 | | 5/2019 | |

OTHER PUBLICATIONS

EP-1020375-A1 English Translation (Year: 2000).*
ES-2361363-A1 English Translation (Year: 2011).*
JP-2019134603-A English Translation (Year: 2019).*
JP-2001238308-A English Translation (Year: 2001).*
CN-106044663-A English Translation (Year: 2016).*
EP-3483092-A1 English Translation (Year: 2019).*
https://info.macktrucks.com/refuse-revolution; "Welcome to the refuse revolution. Mack LR Electric." Retrieved on Mar. 21, 2023.
https://www.youtube.com/watch?v=NQFtAnm7D-c; "All-New Mack LR Electric Garbage Truck." Retrieved on Mar. 21, 2023.

* cited by examiner

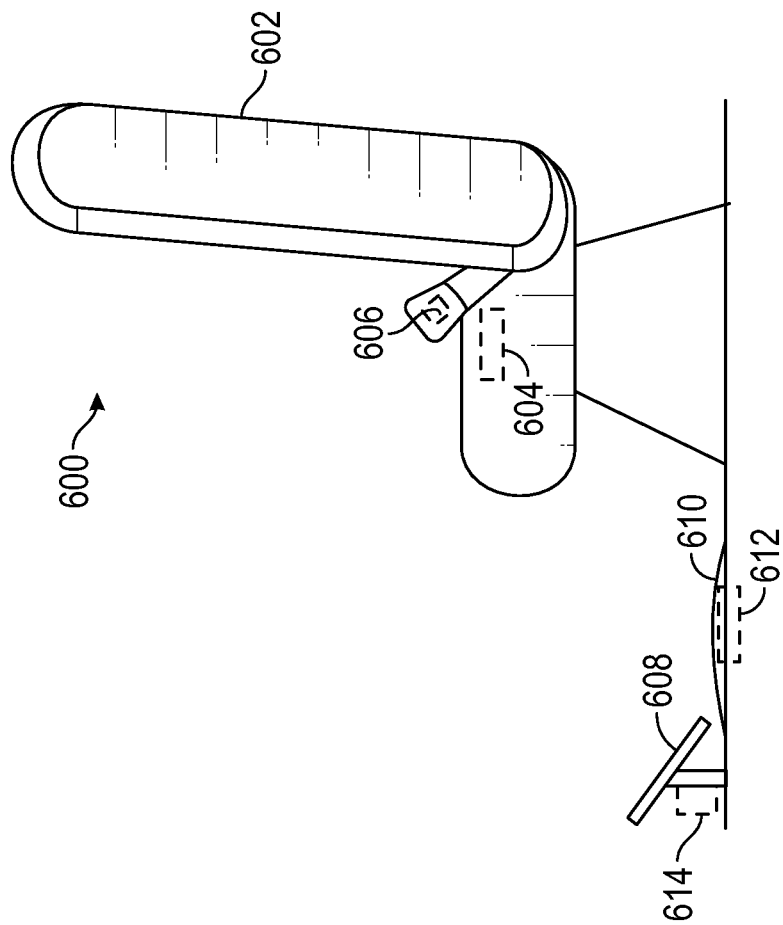
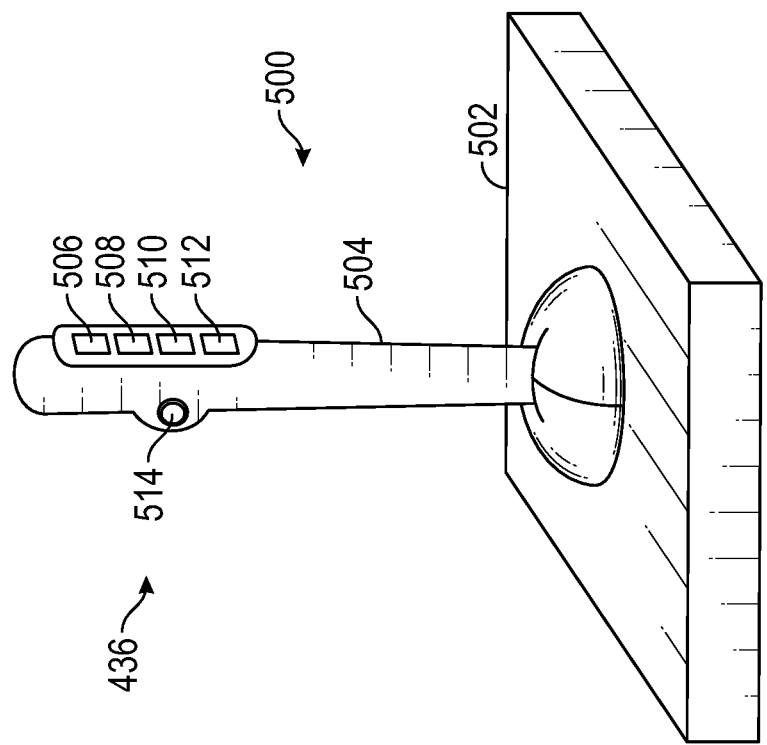
FIG. 11
FIG. 10

REFUSE VEHICLE WITH ELECTRIC CHASSIS

CROSS-REFERENCE TO RELATED APPLICATION

This Application is a continuation of U.S. patent application Ser. No. 17/501,479, filed on Oct. 14, 2021, which claims priority to U.S. Provisional Patent Application No. 63/092,354, filed Oct. 15, 2020, and to U.S. Provisional Patent Application No. 63/147,406, filed Feb. 9, 2021, the contents of which are each hereby incorporated by reference in their entireties.

BACKGROUND

Electric refuse vehicles (i.e., battery-powered refuse vehicles) include one or more energy storage elements (e.g., batteries) that supply energy to an electric motor. The electric motor supplies rotational power to the wheels of the refuse vehicle to drive the refuse vehicle. The energy storage elements can also be used to supply energy to vehicle subsystems, like the lift system or the compactor, in addition to the electric motor that serves as the prime mover.

SUMMARY

One exemplary embodiment relates to a refuse vehicle. The refuse vehicle includes a chassis, an energy storage device supported by the chassis, a body assembly, and a power distribution unit. The energy storage device is configured to provide electrical power to a prime mover. Activation of the prime mover selectively drives the refuse vehicle. The body assembly is configured for storing refuse and is supported by the chassis. The power distribution unit is coupled to the energy storage device and is configured to control power transmission outward from the energy storage device, between the chassis and the body assembly. The body assembly includes a controller that communicates with the power distribution unit to adjust a flow of electrical power from the energy storage device to the body assembly.

Another exemplary embodiment relates to a refuse vehicle. The refuse vehicle includes a chassis, an energy storage device supported by the chassis, a body assembly, and a power distribution unit. The energy storage device is configured to provide electrical power to a prime mover. Activation of the prime mover selectively drives the refuse vehicle. The body assembly is configured for storing refuse and is supported by the chassis. The body assembly includes a cab defining an operator area. The power distribution unit is coupled to the energy storage device and is configured to control power transmission outward from the energy storage device, between the chassis and the body assembly. The body assembly includes a controller that communicates with the power distribution unit to adjust a flow of electrical power from the energy storage device to the body assembly. The cab includes at least one input configured to interact with the controller to adjust the flow of electrical power from the energy storage device to the body assembly.

Another exemplary embodiment relates to a refuse vehicle. The refuse vehicle includes a chassis, an energy storage device supported by the chassis, a body assembly, and a power distribution unit. The energy storage device is configured to provide electrical power to a prime mover. Activation of the prime mover selectively drives the refuse vehicle. The body assembly is configured for storing refuse and is supported by the chassis. The body assembly includes a cab defining an operator area. The power distribution unit is coupled to the energy storage device and is configured to control power transmission outward from the energy storage device, between the chassis and the body assembly. The body assembly includes a controller that communicates with the power distribution unit to adjust a flow of electrical power from the energy storage device to the body assembly. The chassis supports an inverter configured to convert DC electrical power received from the energy storage device into AC electrical power for use within the body assembly.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which:

FIG. 10 is a perspective view of a joystick including different gear selectors for the refuse vehicle of FIGS. 1-4 and 8, according to an exemplary embodiment;

FIG. 11 is a side view of a seat of any of the refuse vehicles of FIGS. 1-4 and 8, including an accelerator sensor, a floor mounted weight sensor, a seat occupancy detector, and a seat belt latch detector, according to an exemplary embodiment.

DETAILED DESCRIPTION

Figure 1:
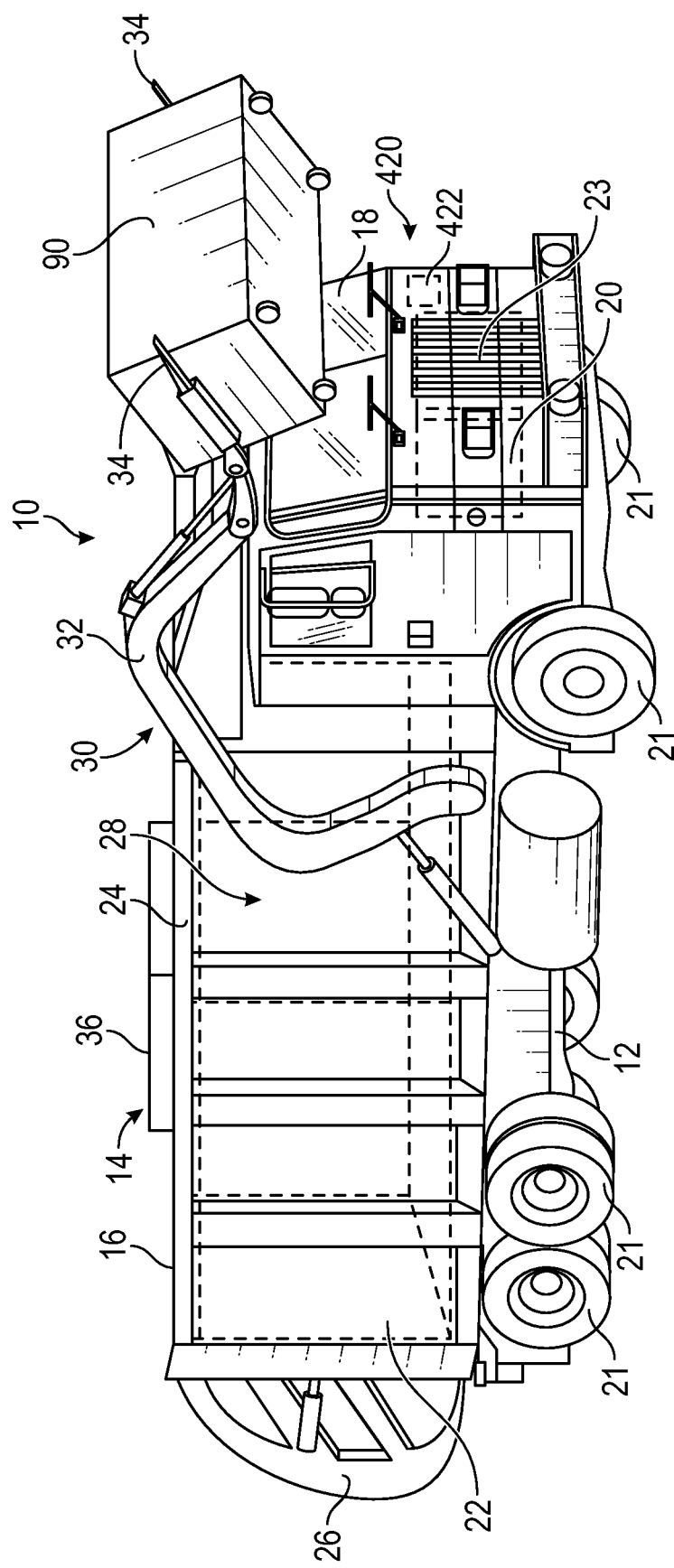
FIG. 1 is a perspective view of a front loading refuse vehicle according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to electric refuse vehicles. Electric refuse vehicles, or E-refuse vehicles, include an onboard energy storage device, like a battery, that provides power to a motor that produces rotational power to drive the vehicle. The energy storage device, which is commonly a battery or battery assembly, can also be used to provide power to different subsystems on the E-refuse vehicle. The energy storage device is also configured to provide hydraulic power to different subsystems on the E-refuse vehicle through an electric power take-off (E-PTO) system. The E-PTO system receives electrical power from the energy storage device and provides the electrical power to an electric motor. The electric motor drives a hydraulic pump that provides pressurized hydraulic fluid to different vehicle subsystems, including the compactor and the lifting system.

A power distribution unit (PDU) and a controller are used to monitor and control the supply of electrical power from the energy storage device to the electric motor, E-PTO, and auxiliary systems on the vehicle. The controller can communicate with the PDU and/or directly with the battery to selectively request and direct electrical power from the battery to the various systems on the vehicle, including the electric drive motor. The controller is configured to receive data from different sensors on the vehicle body, analyze data received from the sensors, and communicate the analyzed data or instructions based upon the analyzed data to the PDU and/or electric motor to adjust the performance of a vehicle chassis (e.g., adjust the motor, positioning, etc.). The controller can be positioned within either of the body assembly or the chassis and can operate as a central processing unit (CPU) to control a subset or all the functions of the vehicle.

Refuse Truck

Referring to FIGS. 1-4, a vehicle, shown as refuse truck 10 (e.g., garbage truck, waste collection truck, sanitation truck, etc.), includes a chassis, shown as a frame 12, and a body assembly, shown as body 14, coupled to the frame 12. The body assembly 14 defines an on-board receptacle 16 and a cab 18. The cab 18 is coupled to a front end of the frame 12, and includes various components to facilitate operation of the refuse truck 10 by an operator (e.g., a seat, a steering wheel, hydraulic controls, etc.) as well as components that can execute commands automatically to control different subsystems within the vehicle (e.g., computers, controllers, processing units, etc.). The refuse truck 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 is one or more electric motors coupled to the frame 12. The electric motors may consume electrical power from an on-board energy storage device (e.g., one or more batteries 23, ultra-capacitors, etc.), from an on-board generator (e.g., an internal combustion engine and alternator), or from an external power source (e.g., overhead power lines) and provide power to the systems of the refuse truck 10. In some examples, the on-board energy storage device is a plurality of rechargeable lithium-ion battery cells.

According to an exemplary embodiment, the refuse truck 10 is configured to transport refuse from various waste receptacles within a municipality to a storage or processing facility (e.g., a landfill, an incineration facility, a recycling facility, etc.). As shown in FIGS. 1-4, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-4, the on-board receptacle 16 and collection chamber 28 are each positioned behind the cab 18. In some embodiments, the collection chamber 28 includes a hopper volume 52 and a storage volume. Refuse is initially loaded into the hopper volume 52 and thereafter compacted into the storage volume. According to an exemplary embodiment, the hopper volume is positioned between the storage volume and the cab 18 (i.e., refuse is loaded into a position behind the cab 18 and stored in a position further toward the rear of the refuse truck 10). The refuse truck 10 can be arranged as a front-loading refuse vehicle (shown in FIGS. 1 and 3), a side-loading refuse vehicle (shown in FIG. 2), or a rear-loading refuse vehicle (shown in FIG. 4), for example.

Figure 3:
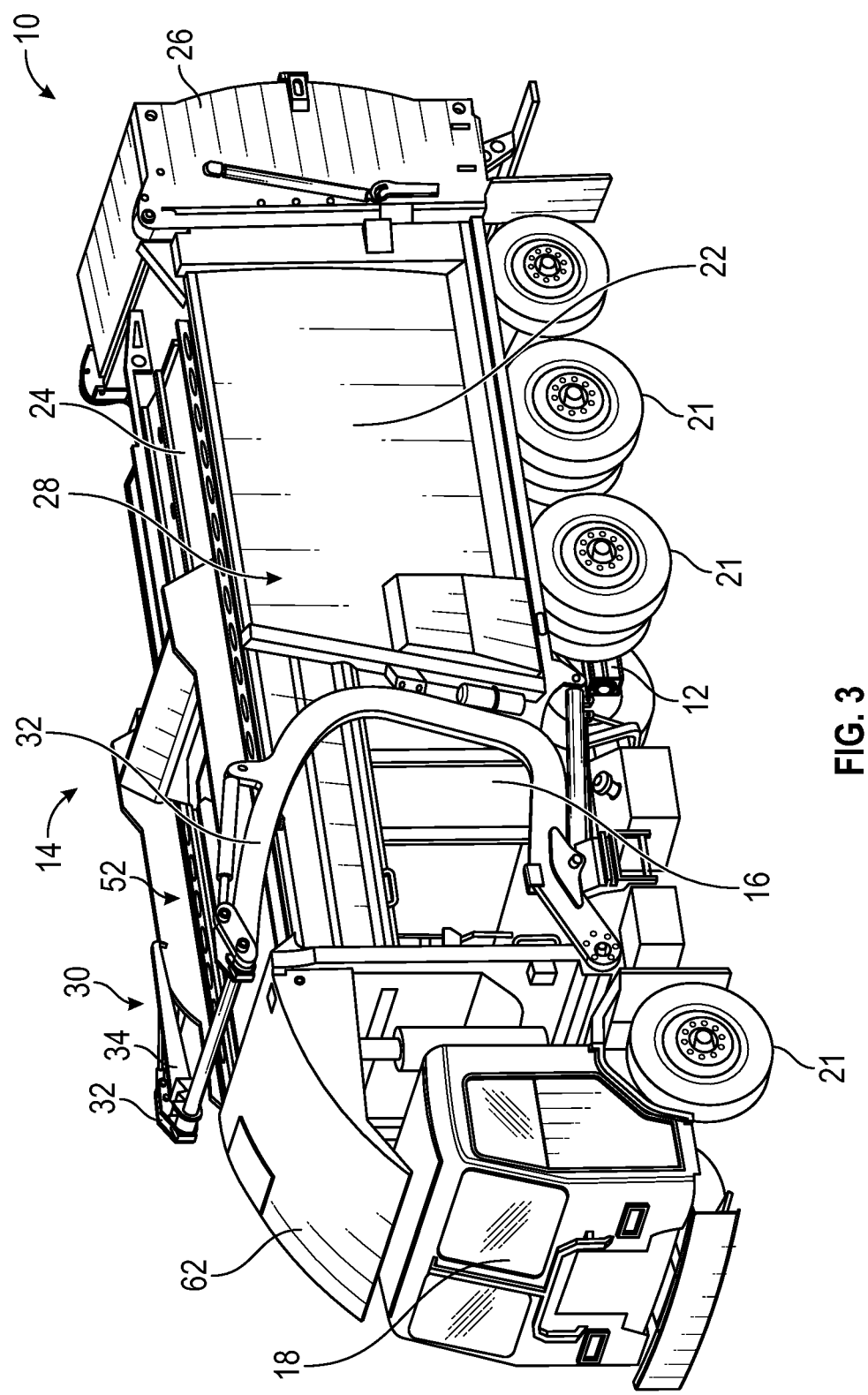
FIG. 3 is a front perspective view of an electric front loading refuse vehicle according to an exemplary embodiment.

Referring again to the exemplary embodiment shown in FIGS. 1 and 3, the refuse truck 10 is a front-loading refuse vehicle. As shown in FIG. 1, the refuse truck 10 includes a lifting system 30 that includes a pair of arms 32 coupled to the body 14 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse truck 10, the forks 34 are positioned to engage the refuse container (e.g., the refuse truck 10 is driven into position until the forks 34 protrude through the apertures within the refuse container). As shown in FIG. 1, the arms 32 are rotated to lift the refuse container over the cab 18. Additional actuators (e.g., a hydraulic cylinder) can articulate the forks 34 to tip the refuse out of the container and into the hopper volume of the collection chamber 28 through an opening in the cover 24. The actuators thereafter rotate the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Figure 2:
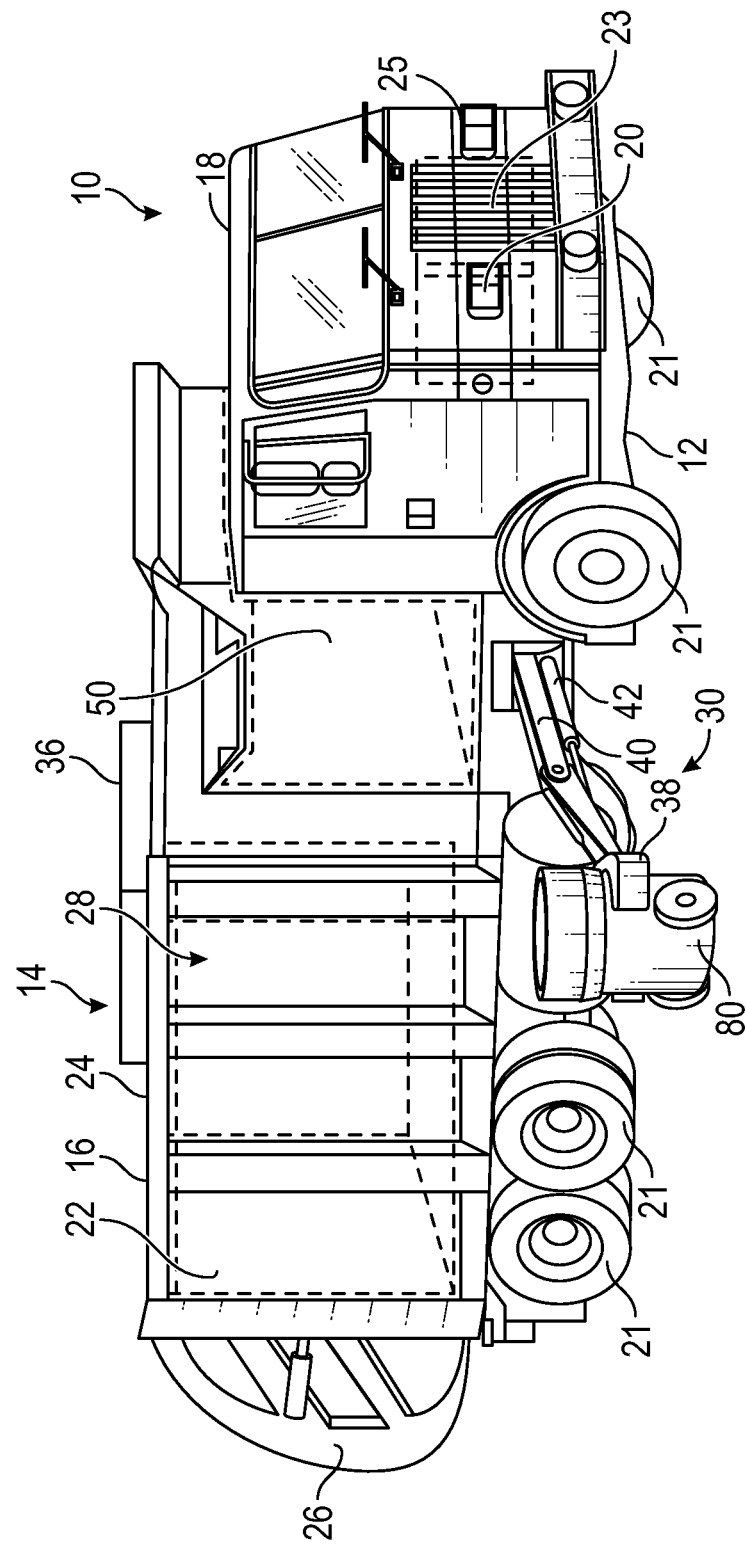
FIG. 2 is a perspective view of a side loading refuse vehicle according to an exemplary embodiment.

Referring to the exemplary embodiment shown in FIG. 2, the refuse truck 10 is a side-loading refuse vehicle that includes a lifting system, shown as a grabber 38 that is configured to interface with (e.g., engage, wrap around, etc.) a refuse container (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder 42) articulates the arm 40 and positions the grabber 38 to interface with the refuse container. The arm 40 may be movable within one or more directions (e.g., up and down, left and right, in and out, rotation, etc.) to facilitate positioning the grabber 38 to interface with the refuse container. According to an alternative embodiment, the grabber 38 is movably coupled to the body 14 with a track. After interfacing with the refuse container, the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume of the collection chamber 28. In either embodiment, the grabber 38 and the refuse container are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Referring to FIG. 3, the refuse truck 10 is a front loading, fully electric E-refuse vehicle. Like the refuse truck 10 shown in FIG. 1, the E-refuse vehicle includes a lifting system 30 that includes a pair of arms 32 coupled to the body 14 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse truck 10, the forks 34 are positioned to engage the refuse container (e.g., the refuse truck 10 is driven into position until the forks 34 protrude through the apertures within the refuse container). Additional actuators (e.g., hydraulic cylinders, linear actuators, etc.) articulate the forks 34 to tip the refuse out of the container and into the hopper volume of the collection chamber 28 through an opening in the cover 24. The actuators thereafter rotate the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Figure 4:
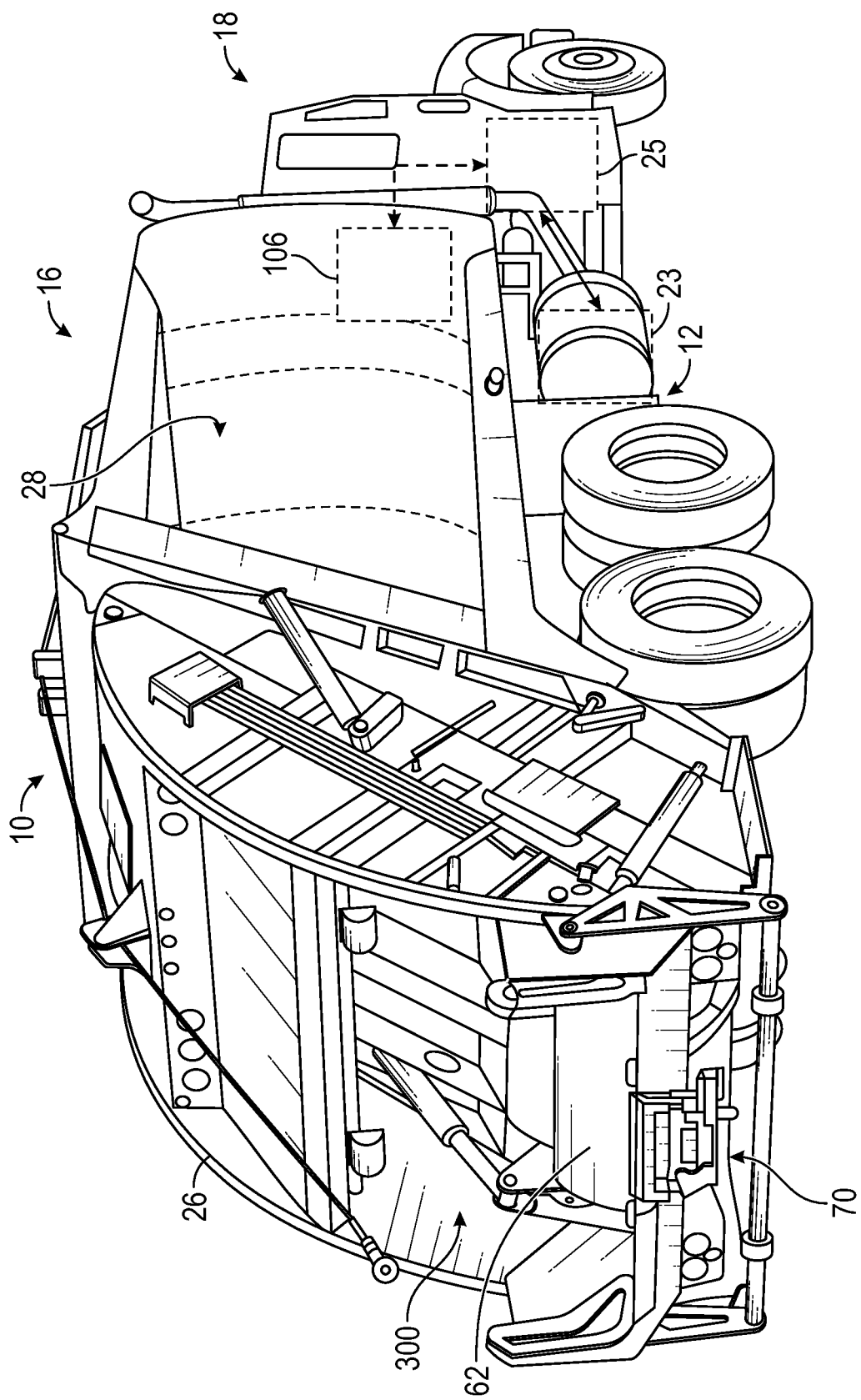
FIG. 4 is a rear perspective view of a rear loading refuse vehicle according to an exemplary embodiment.

As shown in FIGS. 2 and 4, the refuse truck 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor 20) rotates a transmission shaft, which in turn rotates the wheels 21 of the vehicle. The batteries 23 can supply electrical power to additional subsystems on the refuse truck 10, including additional electric motors, cab controls (e.g., climate controls, steering, lights, etc.), the lifting system 30, the compactor 50, and/or auxiliary systems 60, for example.

Referring to FIG. 4, the refuse truck 10 can be a rear-loading refuse vehicle. Like the refuse truck 10 shown in FIGS. 1-3, the refuse truck 10 includes a frame 12 that supports a body assembly that includes an on-board receptacle 16 and a cab 18. A tailgate 26 is movably positioned at a rear of the on-board receptacle 16 and defines a pathway into the collection chamber 28. In some examples, a refuse can tipper assembly 70 is positioned along the tailgate 26 to help invert refuse cans relative to the ground below so that refuse can be transferred from refuse cans into the tailgate 26. A packer 62 can pull refuse within the tailgate 26 upwardly and inwardly (e.g., forwardly) toward the collection chamber 28 for compaction.

The refuse truck 10 can be a hybrid refuse vehicle or an all-electric refuse vehicle, for example, with an electric frame or chassis 12. In hybrid refuse vehicles, the refuse truck can include both electric and hydraulic power systems. The frame 12 supports a primary battery 23 that is configured to supply electrical power to each of the prime mover 20, shown as an electric motor, and the various systems on the body assembly 14 of the refuse vehicle 10. A power distribution unit (PDU) 25 is in communication with the battery 23 and is configured to selectively monitor and supply electrical power from the battery 23 to each of the body assembly 14 and the prime mover 20. The PDU 25 can be a controller, processor, central processing unit (CPU), or other type of programmable or non-programmable device that monitors the battery 23 and the systems on the body assembly 14 and frame 12 that request electrical power from the battery 23. The PDU 25 is configured to control the supply of electrical power from the battery 23 to accommodate the power requests of the various systems on the frame 12 and body assembly 14 of the refuse truck 10. The PDU 25 monitors the battery 23 and controls contactors within the battery 23 to direct electrical power to the various systems within the refuse truck 10. In some examples, the PDU 25 prioritizes electrical power delivery through the refuse truck 10. The PDU 25 can ensure that critical functions (e.g., the prime mover 20, etc.) receive electrical power before auxiliary systems, like the E-PTO system 100, climate control systems, or radio, for example.

The PDU 25 can control the supply electrical power from the battery 23 to the body assembly 14. In some examples, a disconnect 200 is positioned between the PDU 25 and the body assembly 14 to selectively disable electrical power transmission from the battery 23 to the body assembly 14. The disconnect 200 provides selective electrical communication between the batteries 23 and the body assembly 14 that can allow the secondary vehicle systems (e.g., the lift system, compactor, etc.) to be decoupled and de-energized from the electrical power source. The disconnect 200 can create an open circuit between the batteries 23 and the body assembly 14, such that no electricity is supplied from the batteries 23 to the various systems on the vehicle 10. The refuse truck 10 can then be operated in a lower power consumption mode, given the reduced electrical load required from the batteries 23 to operate the refuse truck 10. The disconnect 200 further enables the refuse truck 10 to conserve energy when the vehicle subsystems are not needed, and can also be used to lock out the various vehicle subsystems to perform maintenance activities. The disconnect 200 further allows an all-electric vehicle chassis to be retrofit with hydraulic power systems, which can be advantageous for a variety of reasons, as hydraulic power systems may be more responsive and durable than fully electric systems.

E-PTO System

Figure 5:
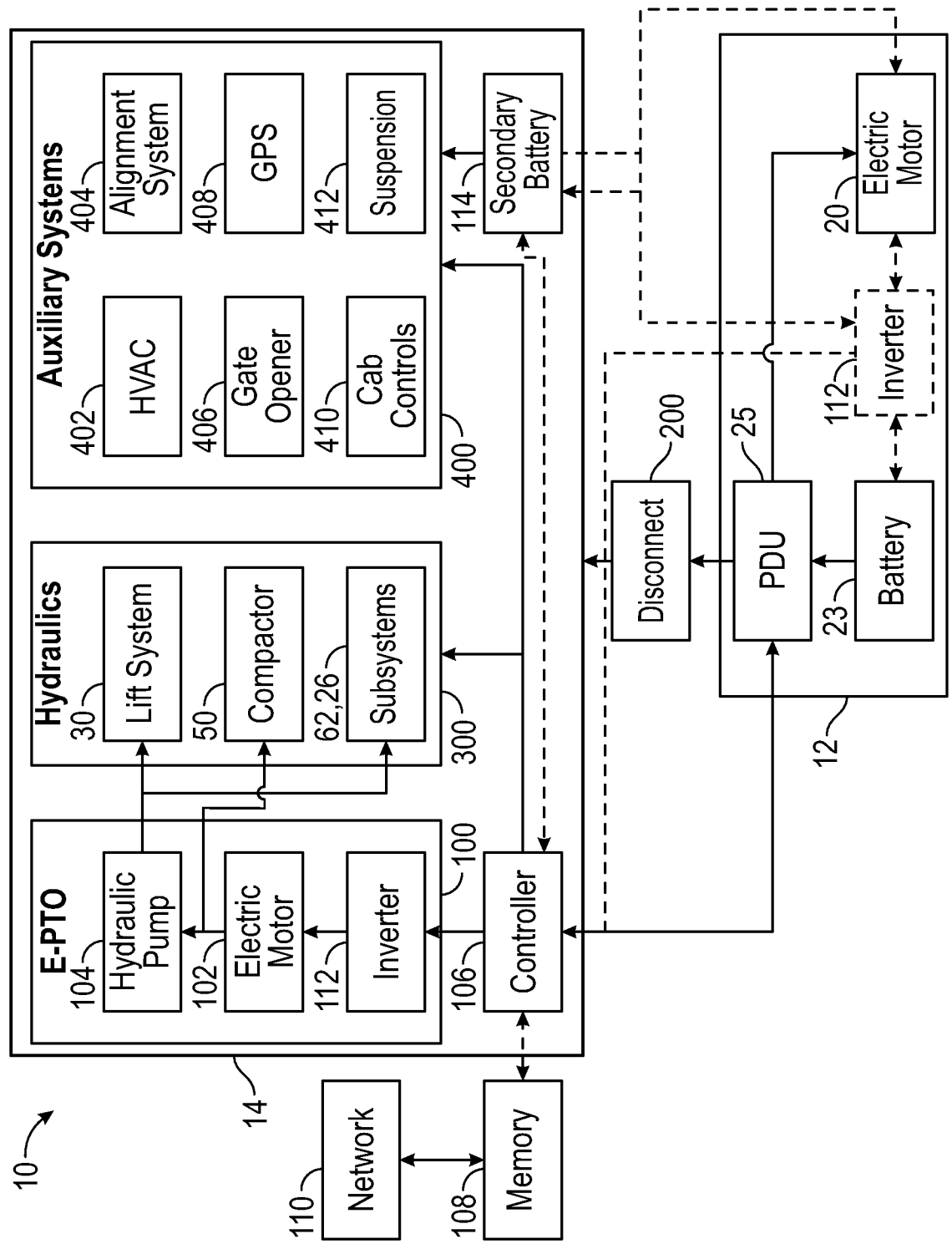
FIG. 5 is a schematic view of a control system that can be incorporated into the refuse vehicle of any of FIGS. 1-4.

The body assembly 14 generally includes an E-PTO system 100, hydraulics 300, and auxiliary systems 400 that are in communication with a central controller 106. The central controller communicates with the PDU 25 to issue electrical power requests that can then be processed and/or otherwise handled by the PDU 25 to transmit electrical power from the battery 23 through to the body assembly 14 and to the systems to be powered. As depicted in FIG. 5, the controller 106 is in communication with a memory 108 (e.g., a cloud-based memory, an archive, a database, onboard memory, etc.) that can supply a variety of different control parameters and information to execute different vehicle functions. In some examples, the memory 108 is in communication with a network 110 (e.g., the internet, a fleet management system, etc.) that provides information to the memory 108 for use by the refuse truck 10. For example, route-based data or past performance data can be provided to the refuse truck 10 through the network 110 and/or the memory 108 to the controller 106.

The controller 106 can distribute electrical power received from the battery 23 and PDU 25 to the various different systems on the refuse truck 10, including an E-PTO system 100, hydraulics 300, and various auxiliary systems 400. The E-PTO system 100, for example, is configured to receive electrical power from the batteries 23 and convert the electrical power to hydraulic power. In some examples, the E-PTO system 100 includes an electric motor 102 driving a hydraulic pump 104. The hydraulic pump 104 pressurizes hydraulic fluid onboard the refuse truck 10, which can then be supplied to various hydraulic cylinders and actuators present upon the body assembly 14 of the refuse truck 10. For example, the hydraulic pump 104 can provide pressurized hydraulic fluid to each of the hydraulic cylinders within the lift system 30 on the refuse truck. Additionally or alternatively, the hydraulic pump 104 can provide pressurized hydraulic fluid to a hydraulic cylinder controlling the compactor 50 or packer 62. In some embodiments, the hydraulic pump 104 also provides pressurized hydraulic fluid to the hydraulic cylinders that control a position and orientation of the tailgate 26, which is movable to empty the vehicle 10 of refuse. The hydraulic pump 104 can be a swashplate-type variable displacement pump, for example, that supplies all the hydraulics 300 upon the refuse truck 10. The hydraulics 300 can be in communication with the controller 106, which can communicate with the electric motor 102 and hydraulic pump 104 to deliver the desired hydraulic loads. Simultaneously, the controller 106 can communicate with the PDU 25 to request the necessary battery power load to drive the electric motor 102 to supply pressurized fluid to the hydraulics 300. In some examples, the controller 106 provides electrical power from the battery 23 to an inverter 112, which can convert DC power from the battery 23 (and from the PDU 25) to AC power for use by the electric motor 102. In some examples, the inverter 112 can be used to vary the frequency of the transformed AC power to adjust the performance of the electric motor 102. In some examples, the inverter 112 can be used to convert electrical power from the battery 23 into AC power for use by the electric motor 20 as well. In some examples, each of the chassis 12 and the body 14 include separate inverters 112 that can be used to supply AC electrical power to components on the chassis 12 and body 14, respectively. The frequency output of the inverter 112 can be adjusted by the controller 106 and/or a variable frequency drive.

The controller 106 at least partially controls the pump 102 and electric motor 104 to deliver pressurized hydraulic fluid to accommodate variable pump loads that may be requested by the hydraulics 300 during normal refuse truck 10 operation. The controller 106 receives signals from various inputs throughout the refuse truck 10 and can subsequently control different components within the body assembly 14 hydraulic circuit to execute different tasks. For example, the controller 106 may receive an input from one or more buttons within the cab 18 of the refuse truck 10 that prompt the lifting system 30 to move in order to raise and empty the contents of a waste receptacle into the on-board receptacle 16 of the refuse truck 10. Upon receiving an input requesting an adjustment of the pump load (e.g., requested movement of the lifting system 30), the controller 106 can activate or adjust an output of the electric motor 102 and pump 104 to deliver pressurized hydraulic fluid from a hydraulic fluid reservoir to the one or more actuators forming the pump load to carry out the requested operation. As depicted in FIG. 5, the controller 106 can work with the hydraulic pump 104 to supply hydraulic fluid to one or more of the lift system 30, the compactor 50, and the various other subsystems upon the body assembly 14 (e.g., the tailgate 26, the packer 62, etc.).

The controller 106 is also in communication with various auxiliary systems 400 on the vehicle body 14 and/or on the frame 12. For example, the controller 106 may communicate with and/or control the operation of the HVAC system 402, a can alignment system 404, a gate opener assembly 406, a global positioning system (GPS) 408, cab controls 410, the vehicle suspension 412, and other subsystems present upon the refuse truck 10. The controller 106 can provide communication between the auxiliary systems 400 and the PDU 25, and can selectively permit the transmission of electrical power from the battery 23 to the auxiliary systems 400 on the refuse truck 10. In some examples, the body assembly 14 further supports a secondary battery 114. The secondary battery 114 can be configured to power the controller 106 and/or other subsystems on the body assembly 14, including the E-PTO system 100 and the auxiliary systems 400. In some embodiments, the secondary battery 114 is placed in selective communication with the prime mover 20 to provide a backup ignition or drive source if the primary battery 23 becomes disabled or runs low on power.

Although the description of the E-PTO system and disconnect have been described within the context of a front end loading refuse truck, the same or similar systems can also be included in both side loading and rear end loading refuse trucks without significant modification. Accordingly, the disclosure should be considered to encompass the E-PTO system and pump in isolation and incorporated into any type or variation of refuse vehicle. Additionally, as described above, multiple torque-limited pumps may be incorporated into a single E-PTO system without departing from the scope of the present disclosure.

Can Alignment Systems

The control schematic and architecture shown in FIG. 5 can be used to execute a variety of different vehicle functions and modes within the refuse truck 10. For example, and as demonstrated in FIG. 5, the refuse truck 10 can include a can alignment system 404. The can alignment system 404 can include one or more sensors positioned about the body assembly 14, including at or near the lift system 30. The sensors monitor a position of a nearby can (e.g., a toter 80, a residential refuse container, a dumpster 90, etc.) and communicate with the controller 106. The sensors and controller 106 can together identify movements that can be made by one or both of the body assembly 14 and frame 12 to achieve proper alignment with the can so that the can will be successfully engaged by the lift system 30 to execute a waste removal process.

The controller 106 is configured to communicate with both of the lift system 30 and the prime mover 20 to execute the steps necessary to achieve proper alignment relative to the can. By knowing (e.g., through communication with the memory 108 and/or the network 110) the amount of permissible movement of the lift system 30 in each direction (e.g., vertically, horizontally, laterally), the controller 106 can first determine whether the current position of the refuse truck 10 relative to the can is within the range of allowable movement of the lift system 30. If the can alignment system 404 determines that the refuse truck 10 is positioned relative to the can within the range of permissible lift system 30 movement relative to the refuse truck 10, the controller 106 sends a command to the E-PTO system 100 and the lift system 30 to engage the can. The controller 106 adjusts a position of the lift system 30 relative to the body assembly 14, engages the can, and inverts the can so that refuse or other waste within the can will be emptied into the on-board receptacle 16 for transport. The lift system 30 can then lower and disengage the can so that the refuse truck 10 can drive to a next location along a route.

If the can alignment system 404 determines that the refuse truck 10 is positioned relative to the can outside of the range of permissible lift system 30 movement relative to the refuse truck 10, the controller 106 can initiate a command to the frame (e.g., through the PDU 25 and to the prime mover 20) to drive the refuse truck 10 to a position within the permissible range. Using the positioning acquired by the sensors within the can alignment system 404, the controller 106 can issue directional data that can then be implemented by the PDU 25, battery 23, and prime mover 20 to move the vehicle to a desired location relative to the can. The controller 106 can communicate both desired direction and magnitude of the adjustment needed so that the distance between the refuse truck 10 and the can is reduced to a point where the can is located within the range of permissible lift system 30 movement relative to the refuse truck 10. Accordingly, the controller 106 can further control a steering system to help execute the alignment process. The steering system can be considered a component of both the frame 12 and the body assembly 14. This process can be particularly useful on both front-end loading and side-loading refuse trucks (e.g., the refuse trucks shown in FIGS. 1-3), as automating a portion of the can engagement and disengagement process can reduce labor costs associated with moving heavy cans into alignment with the refuse truck manually.

In some examples, the can alignment system 404 includes one or more lasers that can help a driver and/or the controller 106 execute a waste removal process from a can, such as the dumpster 90. The can alignment system 404 includes lasers that are mounted onto or near the forks 34. The lasers project light forward to provide a visual indication that corresponds with a current position and/or orientation of the forks 34. The visual indication 34 can be used by a worker (e.g., the driver of the refuse truck 10) to help guide the refuse truck 10 so that the forks 34 are properly positioned relative to the can for engagement.

In some examples, the can alignment system 404 further includes an imaging apparatus and one or more can locating sensors. The can locating sensors can be positioned upon the forks 34 or upon the body assembly 14 (e.g., on the cab 18) to both identify and illuminate cans that are located near the refuse truck 10. In some examples, the can locating sensors communicate with additional target lasers on the refuse truck 10 to illuminate the can "lift points" that correspond with a desired fork location that will successfully raise the can to execute a waste removal process. The target lasers are rotatably coupled to the body assembly 14 and can move through a wide range of angles relative to the refuse truck 10 to illuminate a can within a field of view that extends forward of the refuse truck 10 (in the case of a front end-loading refuse truck) or laterally outward from the refuse truck 10 (in the case of a side-loading refuse truck). The imaging apparatus within the can alignment system 404 can then capture an image of the laser light generated by each of the target lasers and the lasers mounted to the forks 34 of the vehicle. The imaging apparatus can then, in communication with the controller 106 and/or the memory 108 and network 110, calculate the distance and necessary correction to locate the forks 34 within the areas defined by the target lasers. The controller 106 can then communicate these "corrections" to the PDU 25, prime mover 20, steering system, and lift system 30 so that the calculated corrective action can be executed. Once again, the controller 106 can prioritize the order of operation such that if movement of the lift system 30 alone will correct the error, the controller 106 commands the lift system 30 alone to address the error. If misalignment outside of the degree of allowable movement of the lift system 30 is detected, the control instructions can be communicated to the PDU 25, prime mover 20, and steering system until the refuse truck 10 is determined to be within an allowable range of movement so that the lift system 30 can execute the refuse removal process from the can.

Location-Based Operation

The refuse truck 10 is also configured to execute a variety of different location-based and condition-based processes that can link data received or generated by the body assembly 14 to the prime mover 20 and battery 23 to help perform different refuse truck 10 functions. For example, the refuse truck 10 can include a GPS 408 that is positioned within the cab 18 or elsewhere upon the body assembly 14 to monitor a current location of the refuse truck. The GPS 408 communicates with the controller 106 which can, based upon the detected location of the refuse truck 10, modify vehicle performance by activating, deactivating, or optimizing different vehicle subsystems. The controller 106 communicates with the memory 108 and/or the network 110 to access information in real-time corresponding to desired performance characteristics associated with a location of the vehicle. Similarly, the refuse truck 10 (and GPS 408) can include a series of condition sensors that are configured to detect one or more of weather conditions, traffic conditions, roadway conditions, and/or other collectable data along a route. The refuse truck 10 can once again communicate the data from the GPS 408 and associated sensors to the controller 106, which can then execute a series of commands that modify the amount or distribution of electrical power sent from the battery 23 to the body assembly 14 to control the refuse truck 10.

For example, the GPS 408 can work with the controller 106 (and memory 108 and/or network 110) to recognize a variety of different geo-fences that are established for the refuse truck 10. The geo-fences can correspond to different locations along a route that might require or desire different vehicle performance measures. For example, if the refuse truck 10 transitions onto a highway, the associated geo-fence might limit or discontinue power transmission to the E-PTO 100 so that a larger amount of electrical power from the battery 23 is available for use by the prime mover 20 to drive the refuse truck 10 at higher speeds. Another geo-fence can correspond to a dump or refuse collection site. The GPS 408 can communicate with the controller 106 and PDU 25 to control operation of the prime mover 20 and the associated steering system to transition the refuse truck 10 to an autonomous or semi-autonomous mode of operation. The controller 106 can then provide instructions to the E-PTO system 100, hydraulics 300, and auxiliary systems 400 to execute a refuse truck ejection cycle to remove refuse from the on-board receptacle 16. In some examples, the controller 106 also monitors the direction of travel of the refuse truck 10 as it passes through a geo-fence. For example, if the controller 106 detects or receives an indication that the refuse truck 10 has passed a geo-fence traveling in reverse, the controller 106 can transition the vehicle to semi-autonomous or fully-autonomous mode to complete the load ejection process. The controller 106 can control each of the prime mover 20, steering system, E-PTO 100, and hydraulics 300 to automatically execute the load ejection process. If the controller 106 detects or receives an indication that the refuse truck 10 has passed a geo-fence traveling forward, the controller 106 may wait until the controller 106 detects the refuse truck 10 traveling in reverse before transitioning the vehicle to semi-autonomous or fully-autonomous mode.

Other parameters of the refuse truck 10 may be adjusted based upon geo-fencing as well. For example, detected vehicle location (e.g., by the GPS 408) can be cross-referenced or supplemented with information from the memory 108 and/or the network 110 to provide different performance parameters based upon the location of the truck 10. In some examples, the memory 108 stores optimized or pre-programmed performance parameters related to the prime mover 20 or the vehicle suspension 412 (e.g., the frame 12) that can be adjusted based on the detected location of the refuse truck. In some examples, the controller 106 can limit one or more of the prime mover 20 or overall vehicle speed, the available torque to drive the prime mover 20, and/or the permissible acceleration rate of the refuse truck 10 based upon the current location of the truck 10 detected by the GPS 408.

In some examples, the GPS 408 and controller 106 work together to vary the operation of the on-board compactor 50 within the vehicle hydraulics 300. If the refuse truck 10 is performing a collection route, the collection route information may be stored within the memory 108 or is otherwise accessible through the network 110. The controller 106 can analyze the current position of the refuse truck 10 (as provided by the GPS 408) and determine a distance to the next pick-up location along the route. If the determined distance to the next pick-up location exceeds a threshold amount (e.g., 0.5 miles, 1 mile, 2 miles, 5 miles, etc.), the controller 106 can control the E-PTO system 100 to operate the compactor 50. As long as the next pick-up location exceeds the threshold amount, the compactor 50 can remain in the fully-extended position to compact refuse within the on-board receptacle 16. Once the determined distance of the refuse truck 10 to the next pick-up location falls below the threshold amount, the compactor 50 can retract so that the on-board receptacle 16 is positioned to receive more refuse. By maintaining the compactor 50 in the fully-extended position longer and smartly controlling the positioning of the compactor 50, the packing density within the on-board receptacle 16 can be improved. Improved packing density within the refuse truck allows the refuse truck to perform longer routes that include more stops, which can provide additional revenue.

The GPS 408 and data received by the GPS 408 can also be communicated externally from the refuse truck 10. For example, the controller 106 can receive positioning data from the refuse truck 10 that corresponds to a current location. The controller 106 can communicate the current position (or the current position and a future planned route) for the refuse truck 10 to a collection vehicle. The collection vehicle can then travel to meet the refuse truck 10, and can then communicate with the controller 106 to execute a transfer of some or all of the refuse within the refuse truck into the collection vehicle so that refuse can be hauled to an off-site location. Using an intermediate collection vehicle can help the refuse truck 10 save a significant amount of energy by avoiding on-highway trips to collection sites that can take several minutes to perform. By avoiding on-highway trips, the refuse trucks 10 can be designed with smaller and less-expensive components (e.g., prime mover 20 motors, batteries, etc.). In one embodiment, the system avoids high power consuming highway travel speed situations and employs the less-expensive components.

As indicated above, the GPS 408 can also include other types of sensors to associate additional condition-based data with location-based data. For example, the GPS 408 can include weather sensors that monitor the weather conditions outside the refuse truck 10. If the weather sensors detect severe weather, the GPS 408 can report severe weather to the controller 106, which can in turn limit or otherwise restrict the functionality of the prime mover 20. Temperatures above or below set temperature thresholds may also impact the performance of the refuse truck 10. For example, if the GPS 408 and associated sensors determine that the ambient temperature is below a threshold temperature (e.g., below 0 degrees C.), the controller 106 can limit the functionality of certain auxiliary systems 400, as the expected electrical load of the HVAC 402 is much higher. Similar processes can be carried out if the ambient temperature exceeds a threshold level (e.g., above 30 degrees C.). Accordingly, the refuse truck 10 can adjust the vehicle performance and energy consumption based on detected weather conditions.

The GPS 408 can also include road quality sensors. For example, vibrational sensors or imaging devices can be positioned along the body assembly 14 or on the frame 12 to monitor the refuse truck 10 as it traverses a route. If one of the sensors detects a pothole or other roadway defect, for example, the GPS 408 can attribute location-based data with the detected pothole. The positioning and severity of the pothole or road defect can be stored within the memory 108 and sent to the network 110. In some examples, the roadway defect data can be used to influence performance characteristics of the refuse truck 10 as it performs a route that is known to include roadway defects. For example, the controller 106 can adjust the suspension 412 of the frame 12 to provide additional dampening because rougher roadways are expected. The suspension 412 can also be adjusted so that the body assembly 14 sits higher above the wheels 21 to further limit or prevent any unwanted contact between the body assembly 14 and the ground below. In some examples, the data associated with roadway defects and location can be useful to third parties as well. Accordingly, this data can be stored on the network 110 or within the memory 108 and provided or licensed to cities or municipalities to alert transportation departments of deteriorating roadway conditions.

The GPS 408 and controller 106 can also be used to help the refuse truck 10 execute a variety of different route planning and route performance processes. In some examples, refuse collection routes are planned in advance. The refuse collection routes include a series of different stops and travel directions to each location along the route, which can be stored within the memory 108 or network 110. Based upon the number of stops and expected duration of the route, the controller 106 can first calculate the amount or potential need for a range extender (e.g., a fuel-powered turbine generator configured to supply auxiliary electrical power to the prime mover 20). The controller 106 can suggest a recommended amount of auxiliary fuel to be stored on the vehicle. Reducing the amount of fuel stored onboard the vehicle by calculating the potential need for auxiliary power based on route characteristics can further limit the total energy consumption from the battery 23 used to power the refuse truck 10. Reviewing and optimizing routes before performance can also allow the use of smaller range extenders.

The stored routes can include a variety of different generated geo-fences along the way that can be used to adjust vehicle performance during the performance of a route. For example, a geo-fence can identify that the refuse truck 10 is traveling through a residential area, and that noise is preferably limited. Accordingly, the controller 106 can control an on-board auxiliary power unit (APU) to power off when the vehicle is traveling within noise-sensitive areas, as the engine within the APU may otherwise generate a significant amount of noise. In routes where the refuse truck 10 expects to need auxiliary power from the route extender (e.g., the APU), the controller 106 can communicate with the GPS 408 and the APU to operate the prime mover 20 with auxiliary power during periods of highway travel or travel through industrial areas, but can switch (e.g., via communication with the PDU 25) power sources to supply battery power from the battery 23 when the GPS 408 detects that the refuse truck 10 is within a more noise-sensitive area.

The stored collection routes can also use the GPS 408 and controller 106 to adjust the vehicle suspension 412 along the route to accommodate different travel conditions. The GPS 408 can use the condition-monitoring sensors as well as historical data from the memory 108 to generate geo-fences to control the suspension 412 of the refuse truck 10 and to react to real-time conditions. The suspension 412 can include several axles (e.g., tag axles, tandem axles, auxiliary axles) that are designed to help the refuse truck 10 distribute loading during the collection process as more refuse is loaded into the on-board receptacle 16. Based upon stored or detected data received by the GPS 408 and associated sensors, the various axles within the suspension 412 can be controlled. For example, auxiliary axles can be programmed to be automatically lowered (e.g., deployed) at later points in the route where the expected refuse payload is higher. In some examples, axles can be lifted based upon detected vehicle function (e.g., as received from the controller 106). For example, if the refuse truck 10 is traveling in reverse, the tag axle can be raised. In some examples, historical data or real-time data can be used to anticipate or detect rough terrain. One or more axles within the vehicle suspension 412 can be raised to prevent damage to the axles. Geo-fencing can extend around the dump or waste collection facility that can influence the number of axles deployed within the suspension 412, or can influence the height of the body assembly 14 relative to the frame 12. For example, when the GPS 408 detects that the refuse truck 10 has entered the waste collection facility (e.g., by crossing a geo-fence), the controller 106 can automatically raise one or more of the tag axle, tandem axle, and/or auxiliary axle. In some examples, sensors within the on-board receptacle 16 or upon the frame 12 detect the change in load created by the refuse within the refuse truck and automatically deploy one or more of the tag axle or tandem axle. Accordingly, manual interaction from the operator is limited.

The GPS 408 also allows the refuse truck 10 to learn routes that help to optimize refuse collection processes within a fleet of refuse trucks 10. As the refuse truck 10 navigates a collection route, the controller 106 and memory 108 can communicate conditions and data related to the route so that this information can be stored for subsequent use. The network 110 can access and manipulate the information within the memory 108 to develop optimized performance parameters and geo-fencing based upon the detected and experienced route conditions. The network 110 can then store or otherwise access the memory 108 so that other refuse trucks 10 within the same fleet can use the optimized and geo-fenced commercial routes generated by the refuse truck 10. Accordingly, the refuse truck 10 can operate using routes generated by any refuse truck within the fleet when the refuse truck has access to the memory 108 and/or the network 110.

Cab-Based Controls

In some examples, the refuse truck 10 is also configured to learn driver preferences and develop driver profiles as well. Driver preferences can be the product of cab controls 410 or HVAC 402, for example, or may follow driving preferences (e.g., mirror positioning, etc.) In some examples, the refuse truck 10 is further configured to generate profiles for each driver that operates equipment in the fleet. The refuse truck 10 can increase the amount of automation depending on the experience level of the user. For example, less experienced drivers can be defaulted to more automated processes while more experienced drivers may prefer more semi-autonomous operation. The refuse truck 10 adjusts these parameters to ensure that operational characteristics of the refuse truck 10 do not vary significantly based on driver experience level. Driver profiles can be stored centrally as well, within the network 110 or within the memory 108 so that several vehicles within the fleet can access the information and adjust vehicle performance accordingly.

Additional auxiliary systems 400 can be in communication with the controller 106, PDU 25, and battery 23 to send and receive data between the body assembly 14 and the frame 12. For example, the cab controls 410 can include a variety of different subsystems that can be actuated or otherwise manipulated from the cab 18, communicated to the controller 106, and then transmitted to the PDU 25 and/or battery 23 or prime mover 20. The cab controls 410 can include positioning or operational controls for operating each of the E-PTO 100 and hydraulics 300. For example, the cab controls 410 can be used to adjust a position of the lift system 30 or a frequency of the compactor 50 stroke. In some examples, the memory 108 and/or the network 110 stores additional parameters that modify or otherwise manipulate the interaction between the auxiliary systems 400 and the battery 23.

In some examples, the auxiliary systems 400 include sensors positioned within the on-board receptacle 16 or on the frame 12. The sensors are configured to measure the mass of the refuse within the on-board receptacle 16 and communicate with the controller 106 to automatically adjust operation of the compactor 50. While conventional compactors 50 operate each time the lift system 30 completes a refuse removal process by transferring refuse from a can into the on-board receptacle 16, the refuse truck 10 smartly monitors and waits until a threshold amount of refuse has been added before executing the compactor stroke. Because the compactor 50 can require a significant amount of hydraulic power from the E-PTO 100, limiting the number of compactor strokes can greatly reduce the electrical power draw by the electric motor 102 from the battery 23. Alternatively, sensors within the on-board receptacle 16 or along the body assembly 14 can visually monitor the volume of refuse and execute a compactor stroke when the volume of refuse added to the on-board receptacle exceeds a threshold amount. In still further examples, the interior of the on-board receptacle is configured with pressure sensors that communicate with the controller 106 when the sensors are contacted by an item within the on-board receptacle 16. Positioning the pressure sensors along the interior walls of the on-board receptacle 16 (and above the floor) can help to identify when large volumes of refuse have accumulated within the on-board receptacle, necessitating another compactor stroke.

In some examples, the cab controls 410 further include operator detecting sensors that can selectively disable the operation of the refuse truck 10, including the lift system 30. The operator detecting sensors are configured as proximity sensors that detect the presence of a key or tag within a specified target range. The key or tag can be worn or embedded within a vest that is to be worn by the operator of the refuse truck 10. The operator detecting sensors can then sense the presence of the operator within the cab 18 of the vehicle, for example, which can then be communicated to the controller 106 that the lift system 30 can be operated. In other examples, the proximity sensors are positioned at or near the forks 34 of the lift system 30, and the lift system 30 is disabled if the sensor detects the key or tag within a predetermined distance from the forks 34. In some examples, the sensor is a camera or other type of live imaging devices that monitors the area near the forks 34 and communicates with the controller 106 to disable operation of the lift system 30 if an operator is within a designated no occupancy zone. Similar sensors and logic can be used for the tailgate 26 operation as well. For example, if the sensors detect that a person is near the tailgate 26, the controller 106 will disable the hydraulic cylinder(s) or actuators that control the position of the tailgate 26 so that an ejection stroke is not performed. By monitoring the position of the driver or operators of the refuse truck 10, systems can be automatically disabled until the operator is in a preferred position relative to the refuse truck.

The cab controls 410 can also include a gate opener assembly 406. The gate opener assembly 406 is generally configured to interact with, unlock, and open gates that may be positioned to protect commercial or residential property. The gate opener assembly 406 can be at least partially controlled by the hydraulics 300 and the E-PTO 100, and can include one or more actuators (not shown) that extend forward of the cab 18 and the frame 12 to unlock and move gates that otherwise impede forward movement of the refuse truck 10 toward cans. In some examples, the gate opener 406 includes both forward and lateral sliding components that can accommodate different gate styles. The forward sliding components can be used to push gates about a rotational hinge joint, while the lateral sliding components can be used to slide gates laterally to permit access to the refuse truck 10. The gate opener assembly 406 can include a key or fob that is arranged to interact with a reader on the gate over one of near-field communication (NFC), BLUETOOTH, Wi-Fi, and/or radio frequency identification tag (RFID) technology, for example. In some examples, the cab controls 410 include a universal key transmitter that can transmit an identification code that can be used to unlock the gate. By including the gate opener assembly 406, iterative trips out of the cab 18 of the refuse truck 10 to open, move, close, and lock the gate can be avoided, which can provide significant time and labor cost savings. Using remote locking and unlocking provides additional security from unauthorized dumpster use, as customers no longer need to leave gates open or otherwise accessible for refuse collection processes. In some examples, the lock on the gate can include a reader that is configured to interact with refuse trucks 10 in the refuse truck fleet, and customers who have purchased and installed remote locking/unlocking readers will be charged at a lower rate due to the decreased labor cost associated with performing waste collection on their premises.

In some examples, the cab controls 410 include multiple displays within the cab 18 of the refuse truck 10. For example, a primary display can be centered along the dashboard (e.g., aligned with the steering wheel, etc.) and a secondary display can be positioned alongside the driver's seat. The cab controls 410 are configured to control the displays within the cab 18 depending upon the detected operation of the prime mover 20 and based upon information received by one or more of the PDU 25 and the controller 106. For example, during normal forward operation of the refuse truck, the primary display may show various vehicle performance characteristics, including vehicle speed, remaining battery life, motor temperature, fluid pressure, and the like. The secondary display may show information about the subsystems on the vehicle, including the hydraulics, such as the lift system 30 or compactor. In some examples, the secondary display provides a visual indication from a camera that is positioned in line with the lift system 30 that can be used by the operator to position the refuse truck 10 relative to a can to be picked up. If the cab controls 410 receive an indication that a refuse emptying process is going to be performed, the data presented on the displays may switch. The driver can remain focused with his or her head facing forward so that the travel of the vehicle can be watched at the same time that the camera is displaying the positioning of the lift system 30 relative to the can on the primary display. The secondary display can then present the various vehicle performance characteristics that are presented by the primary display under normal conditions. A similar process can be carried out when the refuse truck 10 begins traveling in reverse. The primary display can present the live images provided by the back-up camera, which can allow the driver to better position the vehicle and avoid otherwise awkward body positioning to drive the vehicle rearward. In some examples, the primary screen is incorporated directly into the steering wheel. Optionally, emergency information (e.g., battery life, oil pressure, etc.) is always displayed on the primary display, regardless of vehicle operational mode.

Power Distribution and Management

The refuse truck 10 can also include several power saving or power generation features to help further extend the life of the battery 23 and extend the allowable range of the refuse truck 10. For example, the HVAC 402 can be significantly simplified to reduce the number of pumps or compressors within the system. In some examples, the HVAC 402 within the body assembly 14 (and the cab 18, specifically) is in communication with the controller 106, PDU 25, and battery 23. The HVAC 402 can be a single integrated thermal management system that is configured to supply heating, cooling, and air flow to the entire body assembly 14 (e.g., to both the cab 18 and the on-board receptacle 16). In normal or standard operating conditions, the HVAC 402 can require a significant power draw from the battery 23. The power draw necessary to achieve desired climate control conditions is amplified when ambient outdoor temperatures are very high or very low. To avoid excessive power draw from the battery 23, the PDU 25 and the controller 106 can be configured to reduce, limit, or disable the HVAC 402 under certain operating conditions. For example, if the PDU 25 communicates that the remaining battery 23 life is low, the controller 106 can reduce the operation of the HVAC 402 to partial functionality. For example, pumps and compressors within the HVAC 402 may be disconnected from power but the fans can continue operating. If the remaining battery 23 life continues to fall, the PDU 25 and controller 106 can fully disable the HVAC 402 so that the remaining battery life is conserved for use with the prime mover 20.

The controller 106 and PDU 25 are further configured to adjust the power distribution from the battery 23 to the body assembly 14 based upon detected conditions within the battery 23 or upon the refuse truck 10, generally. The PDU 25 is configured to prioritize the systems within the refuse truck 10 so that electrical power from the battery 23 is distributed to critical systems before auxiliary systems. In some examples, the refuse truck 10 is configured to operate in a "limp home" mode. When the remaining battery 23 life falls below a set threshold (e.g., 10 percent charge remaining, 5 percent charge remaining, etc.), the PDU 25 and controller 106 can communicate to block, disable, or limit the operation of the different systems upon the body assembly 14. The HVAC 402 can be limited or temporarily disabled, the E-PTO 100 can be disconnected from electrical power (e.g., the electric motor 102 can be stopped), and the auxiliary systems 400 can be disconnected from the battery 23. In some examples, the refuse truck 10 is configured with two tiers of reduced operation. For example, when the remaining charge on the battery 23 falls below a first threshold (e.g., 10 percent), functionality of the E-PTO 100, hydraulics 300, and auxiliary systems 400 are reduced. The frequency of compactor 50 operation is reduced, the lift system 30 can be disabled to avoid adding more refuse into the on-board receptacle 16. The GPS 408 can continue to monitor the location of the refuse truck 10 and can communicate with the controller 106 and PDU 25 to allow for limited operation of the compactor 50 upon determining that the refuse truck 10 is positioned within a refuse collection site (e.g., a dump) so that an ejection stroke can be performed. Similarly, the controller 106 can operate the E-PTO 100 and hydraulics 300 to raise the tailgate 26 upon determining that an ejection stroke is being performed. If the remaining battery 23 power falls below a second threshold (e.g., 5 percent), the PDU 25 can reduce power supply from the battery 23 to the body assembly 14 so that only the prime mover 20 and the cab controls 410 (e.g., the dashboard and steering) remain operational until the refuse truck 10 is reconnected to the power source. The PDU 25 can limit the acceleration curve and/or maximum output of the prime mover 20 to further conserve battery power.

In some examples, the refuse truck 10 is configured to include supplemental power supplies and/or energy saving devices. For example, one or more solar panels can be positioned along the body assembly 14. In some embodiments, solar panels extend along a top of the cab 18 and the on-board receptacle 16. The solar panels can capture solar energy, which can be converted into usable battery power that can be stored and/or used by the battery 23. Additionally or alternatively, the refuse truck 10 can be outfitted with regenerative brakes. The brakes can harvest rotational energy or heat generated by the brakes while the refuse truck 10 drives so that battery power 23 is conserved. The brakes can resupply the energy captured to the PDU 25 or to the battery 23.

Various modifications can be made to the body assembly 14 to further limit the consumption of electrical power from the battery 23. For example, a variety of different aerodynamic features can be incorporated into the body assembly 14 to reduce vehicle drag during normal travel conditions. In some embodiments, fairings are positioned between the on-board receptacle 16 and the cab 18. The fairings can help reduce drag that might otherwise be caused by low pressure zones behind the cab 18. Additionally, skirts can be incorporated into the frame 12 of the refuse truck to reduce air travel beneath the body assembly 14 to again reduce low pressure zones within the refuse truck 10 that can produce drag. The skirt can also provide additional protection to the battery 23 from debris or other items that might contact the frame 12 of the refuse truck 10. In some examples, the skirt is configured to deploy when the refuse truck reaches a threshold speed. For example, the skirt can deploy when the controller 106 detects that the vehicle has reached a speed in excess of 20 miles per hour. The tailgate 26 can also be modified to reduce drag by incorporating a gradual taper or tail-like shape. The tailgate 26 design reduces the size of the low pressure zone formed behind the refuse truck 10 as it travels.

The lift system 30 can also be selectively positioned to reduce drag and battery power consumption by the refuse truck. The forks 34 of the lift system 30 can be moved between several positions to help improve the aerodynamics of the refuse truck 10. For example, the forks 34 can be positioned in a first location near the frame 12 of the vehicle in a rest position prior to engaging a can. The forks 34 can transition to a second, raised position to execute the refuse collection process to empty refuse into the on-board receptacle 16. The forks 34 can also be positioned in a third, intermediate position for traveling. The third, intermediate position can be between the first position and the second position and can arrange the forks 34 to maximize the aerodynamic effect of the forks 34 (e.g., to reduce drag). In the third position, the forks 34 are directed approximately parallel to the ground below. Optionally, the forks 34 can be provided with an aerodynamic sheath that can receive the forks 34 when not in use to further improve the aerodynamics of the vehicle.

In some examples, the body assembly 14 is reduced in size to further reduce the amount of energy consumption needed to operate the refuse truck 10. In some examples, the height of the lift system 30 or the range of permissible travel of the lift system 30 is reduced. Accordingly, the hydraulics 300 operating the lift system 30 can be reduced in size and complexity, and less power is needed to transition the lift system 30 between the lowered and raised positions to execute a waste removal process. In some examples, the size of the cab 18 is reduced so that only a single occupant can reside within the cab 18. Reducing the size of the cab 18 reduces the weight of the body assembly 14 and significantly reduces the power consumption of the HVAC system 402, as the area for climate control is reduced. In some examples, the entire body assembly 14 is formed from a single, unitary structure. The cab 18 and on-board receptacle 16 can be made from a continuous body, and the sub-frame and ladder frame traditionally used to mount the body assembly 14 is removed. The removal of more body assembly 14 components further reduces the mass of the refuse truck 10, and allows for additional useful weight to be added to the frame 12, like additional batteries 23.

Auxiliary Systems

Figure 6:
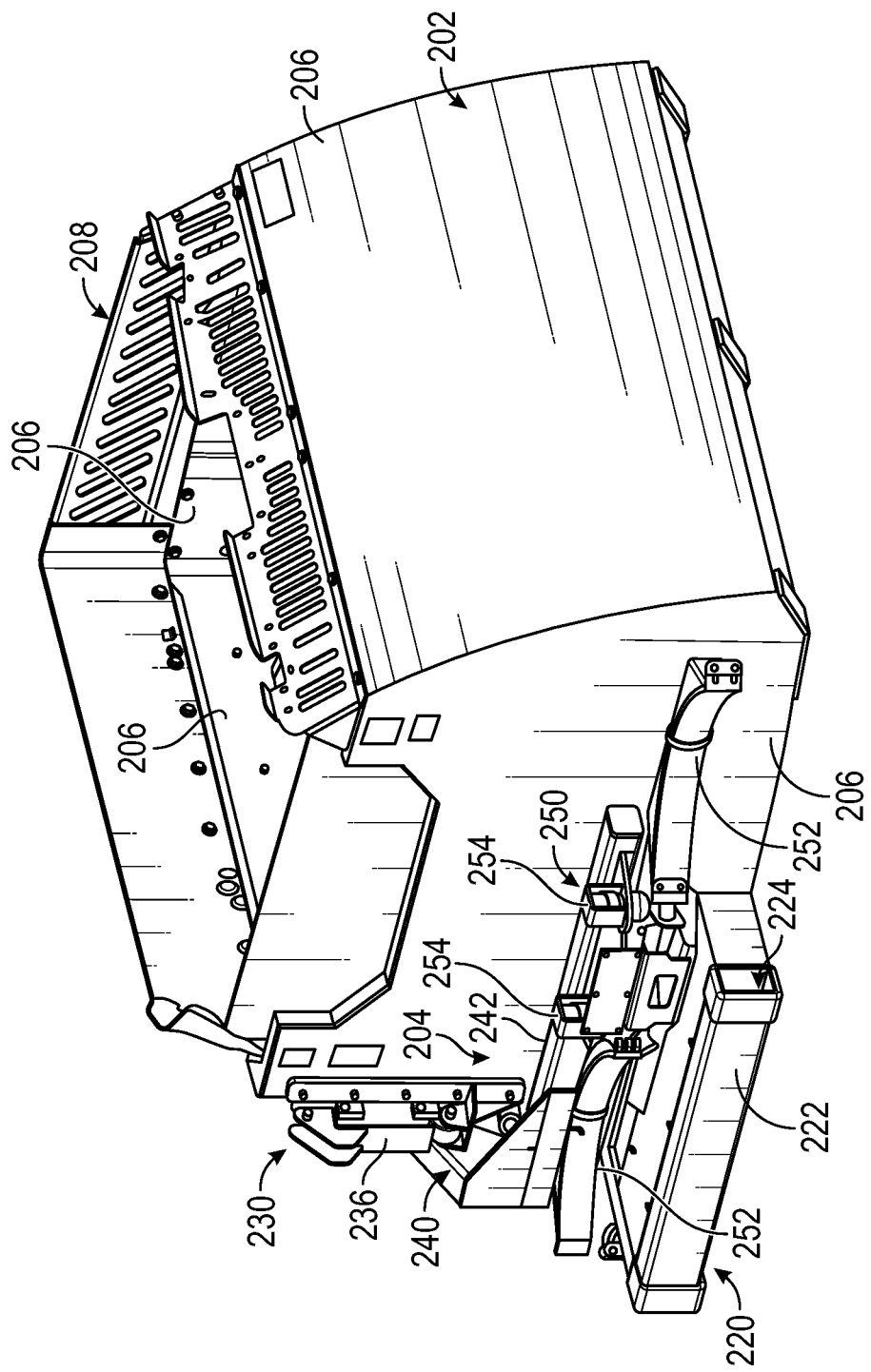
FIG. 6 is a perspective view of a carry can that can be coupled to the refuse vehicle of any of FIGS. 1-4 and placed into communication with the control system of FIG. 5.
Figure 7:
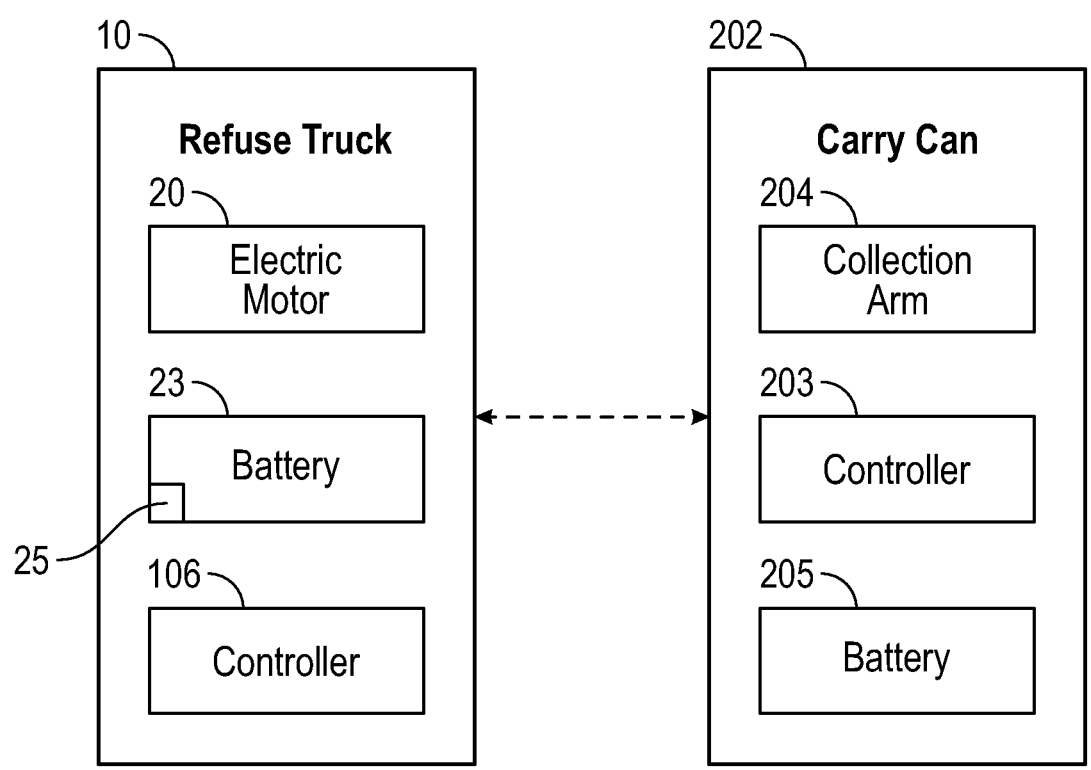
FIG. 7 is a schematic view of a control system including the carry can of FIG. 6 and one of the refuse vehicles of FIGS. 1-4.

In some examples, and as depicted in FIGS. 6-7, the controller 106, PDU 25, and battery 23 can transmit control signals and/or electrical power to auxiliary systems, like a refuse container assembly or "carry can" device 202. The carry can device 202 is configured to selectively couple with the forks 34 of a front loading refuse truck (e.g., the refuse trucks 10 shown in FIGS. 1 and 3), and can send or receive control signals that can be used to adjust the steering or direction of travel of the prime mover 20, for example. The carry can device 202 includes a container and a refuse collection arm assembly 204. As shown in FIG. 6, the refuse container within the carry can device 202 includes a series of walls 206 that cooperatively define an internal cavity or volume, shown as container refuse compartment 208. According to an exemplary embodiment, the container refuse compartment 208 is configured to receive refuse from the collection arm assembly 204.

The carry can assembly 202 includes an interface, shown as fork interface 220. The fork interface 220 includes a pair of interface portions, shown as fork interfaces 222, positioned along opposing walls 206. Each fork interface 222 defines a pocket, recess, chamber, or volume, shown as fork pocket 224. According to an exemplary embodiment, the fork pockets 224 are configured to receive the forks 34 of the refuse truck 10. The lift system 30 may thereby be configured to lift the carry can assembly 202 to empty the refuse within the container refuse compartment 208 of the refuse container into the collection chamber 28 of the refuse vehicle 10. In other embodiments, the container assembly 202 is directly coupled to the lift arms 32.

The collection arm assembly 204 is coupled to a rear wall 206 of the refuse container 202. The collection arm assembly 204 includes a first portion, shown as translatable portion 230, a second portion, shown as rotatable portion 240, and a third portion, shown as grabber assembly 250. The translatable portion 230 of the collection arm assembly 204 includes a carriage assembly, shown as slide track 232, a first actuator (e.g., pneumatic actuator, hydraulic actuator, electric actuator, etc.), shown as translation actuator 234, and a slideable member, shown as slide assembly 236. As shown in FIG. 6, the slide track 232 is coupled (e.g., fastened, welded, etc.) to the rear wall 206 of the refuse container. According to an exemplary embodiment, the slide assembly 236 is slidably coupled to the slide track 232. The translation actuator 234 is positioned to facilitate selectively extending and retracting the slide assembly 236 relative to the slide track 232 such that the grabber assembly 250 of the collection arm assembly 204 may extend laterally outward from the refuse container and retract laterally inward toward the refuse container 202, according to an exemplary embodiment.

The rotatable portion 240 of the collection arm assembly 204 includes an arm, shown as rotatable arm 242, and a second actuator (e.g., pneumatic actuator, hydraulic actuator, electric actuator, etc.), shown as lift actuator 244. The rotatable arm 242 is pivotally coupled to the slide assembly 236 and rotates about a joint, shown as pivot 246, extending along a longitudinal axis. The grabber assembly 250 is coupled to an end of the rotatable arm 242 (e.g., opposite the pivot 246, etc.). Specifically, the grabber assembly 250 includes a pair of can interface members, shown as claws 252, that are pivotally coupled to the rotatable arm 242. A pair of third actuators (e.g., pneumatic actuators, hydraulic actuators, electric actuators, etc.), shown as grabbing actuators 254, are coupled to the rotatable arm 242 and the claws 252. The grabbing actuators 254 are configured to pivot the claws 252 about substantially vertical axes toward or away from one another to close or open the grabber assembly 250, respectively. According to an exemplary embodiment, the grabber assembly 250 is configured to selectively open and close to engage and release a refuse bin. The lift actuator 244 is positioned to facilitate selectively pivoting the rotatable arm 242 and the grabber assembly 250 about the pivot 246, according to an exemplary embodiment. The collection arm assembly 204 may thereby facilitate engaging a refuse bin (e.g., positioned at a curb of a driveway, etc.) to deposit refuse from the refuse bin into the container refuse compartment 208 of the refuse container 202. Various modifications can be made to the carry can assembly 202 as well, including the mounting interface. Various different possibilities are shown and described in detail within (i) U.S. Pat. No. 10,035,648, filed May 31, 2017, (ii) U.S. Pat. No. 10,351,340, filed Jul. 27, 2018, (iii) U.S. Pat. No. 10,513,392, filed May 16, 2019, and (iv) U.S. Patent Publication No. 2020/0087063, filed Nov. 21, 2019, all of which are incorporated herein by reference in their entireties.

As shown in FIG. 7, the carry can assembly 202 can include its own controller 203 and battery 205 that can share information and/or electrical power with the refuse truck 10. In some examples, the controller 106 and PDU 25 communicate with the controller 203 to supply additional battery power from the battery 23 to the carry can assembly 202. In some examples, the controller 203 on the carry can assembly 202 transmits instructions to the controller 106, which can then be executed by the prime mover 20 and/or steering system on the refuse truck. For example, the carry can assembly 202 can transmit alignment instructions to the refuse truck that can then be executed by moving the vehicle 10. In some examples, the carry can assembly 202 can transmit battery power from an on-board power supply (e.g., a battery 205) to the refuse truck 10, which can then be stored by the battery 23 or otherwise used by the refuse truck 10 to power various vehicle subsystems. The connection between the carry can assembly 202 and the refuse truck 10 allows for information and electrical power to be shared between the carry can assembly 202, the refuse truck frame 12, and the refuse truck body assembly 14 to control the overall function and performance of the refuse truck 10. In some examples, the carry can controller 203 includes stored or accessible performance parameters that limit the allowable function of the prime mover 20 or lift system 30 on the refuse truck 10. In still other examples, the carry can controller 203 includes a variety of sensors (position sensors, cameras, etc.) that can be used by the controller 106 and prime mover 20 to autonomously or semi-autonomously drive the refuse truck 10.

Using the previously described systems and methods, a refuse truck 10 can be effectively outfitted with a control system that uses information acquired or otherwise provided to the body assembly 14 to control the operation of the frame 12. The refuse truck 10 and its subsystems can be fully integrated into an electric frame 12, and can be configured to selectively draw power from the primary battery 23 positioned on the frame 12. The centralized control architecture allows information to be passed from the frame 12 to the body assembly 14 and from the body assembly 14 to the frame 12 to control different aspects of the refuse truck's 10 performance. The power distribution from the primary battery 23 can be monitored and controlled on either of the body assembly 14 or the frame 12 to help further automate the operation of the refuse truck 10.

Control System

Figure 8:
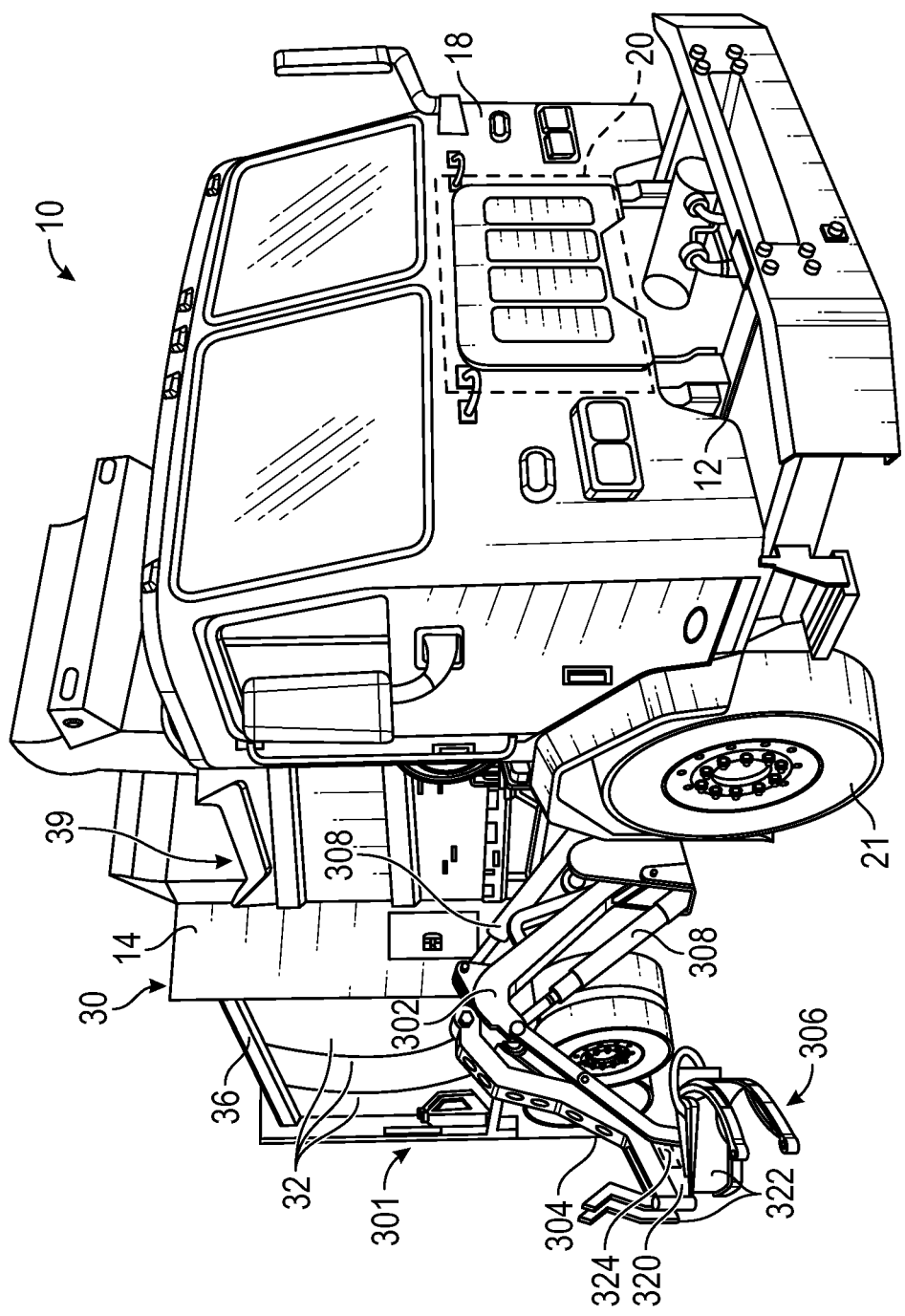
FIG. 8 is a perspective view of a side-loading refuse vehicle, according to an exemplary embodiment.

According to the exemplary embodiment shown in FIG. 8, the refuse vehicle 10 is shown as a side-loading refuse truck. In other embodiments, the refuse vehicle 10 is configured as a rear-loading refuse truck (e.g., as shown in FIG. 4). In still other embodiments, the vehicle is another type of vehicle (e.g., a skid-loader, a telehandler, a plow truck, a boom lift, a concrete mixer, etc.). As shown in FIG. 8 and discussed above with respect to FIGS. 1-4, the refuse vehicle 10 includes a chassis, shown as frame 12; a body assembly, shown as body 14, coupled to the frame 12 (e.g., at a rear end thereof, etc.); and a cab, shown as cab 18, coupled to the frame 12 (e.g., at a front end thereof, etc.). The frame 12 extends longitudinally (i.e., along a direction of travel of the vehicle 10). A lateral direction is defined perpendicular to the longitudinal direction. The cab 18 may include various components to facilitate operation of the refuse vehicle 10 by an operator (e.g., a seat, a steering wheel, hydraulic controls, a user interface, switches, buttons, dials, etc.). As discussed previously, the refuse vehicle 10 includes a prime mover or primary driver (e.g., an engine, an electric motor, etc.), shown as motor 20, coupled to the frame 12 at a position beneath the cab 18. The motor 20 (e.g., an electric motor, an internal combustion engine, etc.) is configured to provide power to tractive elements, shown as wheels 21, and/or to other systems of the refuse vehicle 10 (e.g., a pneumatic system, a hydraulic system, an electrical system, etc.). The prime mover 20 may be configured to utilize one or more of a variety of fuels (e.g., gasoline, diesel, bio-diesel, ethanol, natural gas, etc.), according to various exemplary embodiments. According to an alternative embodiment, the prime mover 20 additionally or alternatively includes one or more electric motors coupled to the frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, solar panels, etc.), and/or from an external power source (e.g., overhead power lines, etc.) and provide power to the systems of the refuse vehicle 10.

As shown in FIG. 8, the refuse vehicle 10 can include a control system 420 including a controller 422 (e.g., similar to or identical to the controller 106, discussed above). The controller 422 can be a single controller, multiple controllers, multiple control systems, etc., configured to control operation of the refuse vehicle 10. The controller 422 may be or include processing circuitry and can be integrated with or communicably coupled with any other control system (e.g., a chassis control system, a body control system, a lighting system, a sensor system, etc.) of the refuse vehicle 10. For example, the controller 422 may be, include, or communicate with an engine control module (ECU) of the refuse vehicle 10, a transmission control module (TCU) of the refuse vehicle 10, etc.

In the embodiment shown in FIG. 8, the refuse vehicle 10 is a side-loading refuse vehicle and includes a second lift mechanism/system (e.g., a side-loading lift assembly, etc.) or refuse collection arm, shown as lift assembly 301. The lift assembly 301 includes a first arm, shown as lift arm 302. A proximal end of the lift arm 302 is pivotally coupled to the frame 12 and/or the body 14 such that the lift arm 302 pivots about a first longitudinal axis. A second arm, shown as lift arm 304, is pivotally coupled to a distal end of the lift arm 302 such that the lift arm 304 pivots about a second longitudinal axis. A grabber assembly 306 is pivotally coupled to a distal end of the lift arm 304 (e.g., opposite the lift arm 302, etc.). A pair of actuators (e.g., pneumatic actuators, hydraulic actuators, electric actuators, etc.), shown as lift arm actuators 308, are coupled to the frame 12 and the lift arm 302 or the lift arm 304 (e.g., directly, indirectly through one or more linkages, etc.). The lift arm actuators 308 are configured to extend and retract to move the lift arm 302, the lift arm 304, and the grabber assembly 306 relative to the frame 12 and the body 14. Specifically, extension and retraction of one of the lift arm actuators 308 may move the grabber assembly 306 primarily laterally relative to the frame 12 and the body 14. Extension and retraction of the other of the lift arm actuators 308 may move the grabber assembly 306 primarily vertically relative to the frame 12 and the body 14. The grabber assembly 306 may be coupled to the lift arm 302 and/or the lift arm 304 through one or more linkages (e.g., forming a four bar linkage) such that the orientation of the grabber assembly 306 is dependent on the orientation of the lift arm 302 and/or the lift arm 304.

The grabber assembly 306 includes a grabber base 320 pivotally coupled to the lift arm 304. A pair of can interface members, shown as claws 322, are pivotally coupled to the grabber base 320. A second actuator (e.g., pneumatic actuator, hydraulic actuator, electric actuator, etc.), shown as grabbing actuator 324, is coupled to the grabber base 320 and the claws 322. The grabbing actuator 324 is configured to pivot the claws 322 (e.g., about substantially vertical axes as shown in FIG. 8) toward or away from one another to close or open the grabber assembly 306, respectively. According to an exemplary embodiment, the grabber assembly 306 is configured to selectively open and close to engage and release a refuse bin. The lift assembly 301 may thereby facilitate engaging a refuse bin (e.g., positioned at a curb of a driveway, etc.) to deposit refuse from the refuse bin into the refuse compartment 30.

Figure 9:
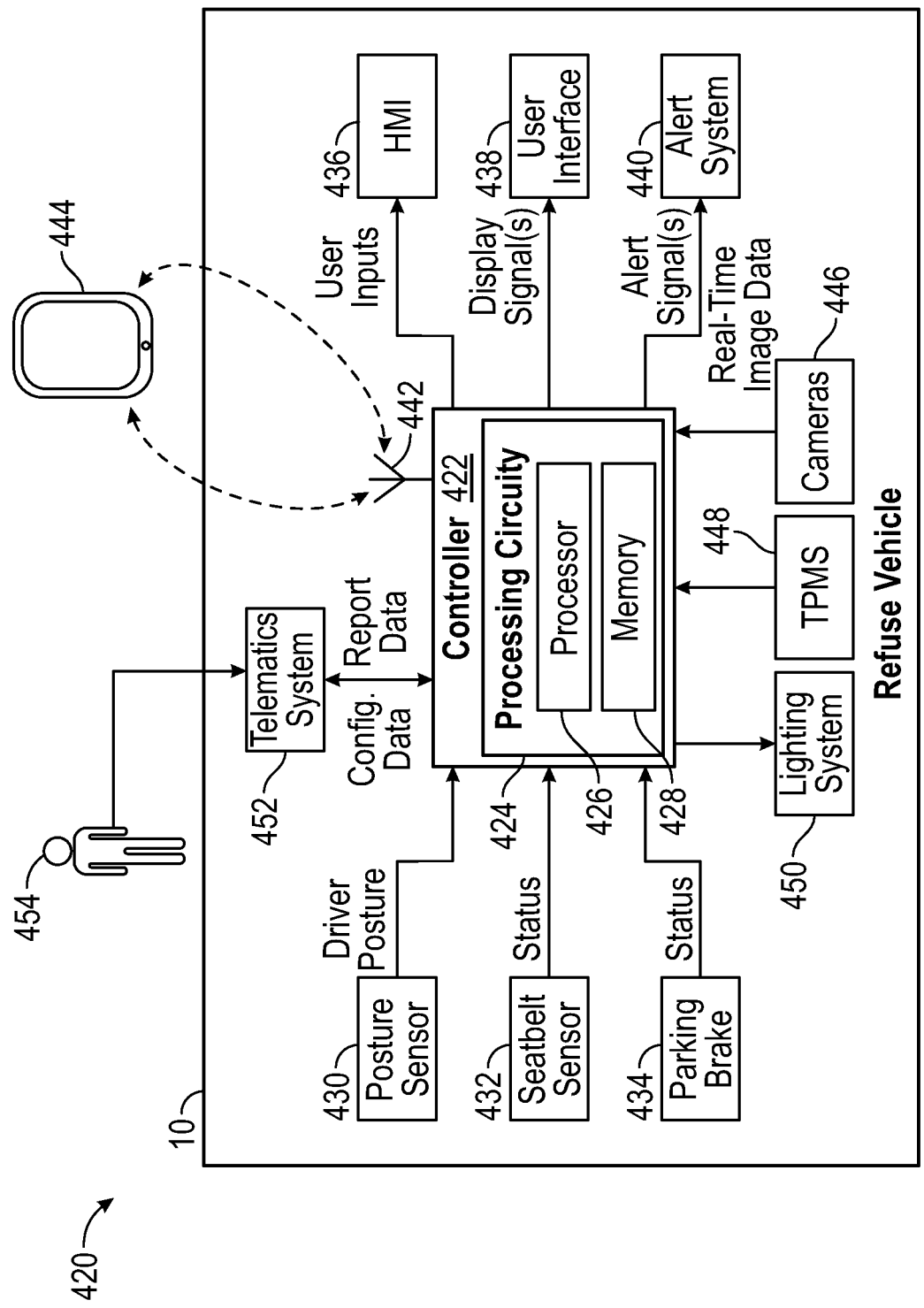
FIG. 9 is a block diagram of a control system for any of the refuse vehicles of FIGS. 1-4 and 8, according to an exemplary embodiment.

Referring to FIG. 9, the control system 420 can include the controller 422, configured to receive different sensor or input data from a variety of devices, and provide control data to various systems, sub-systems, etc., of the refuse vehicle 10. The refuse vehicle 10 can include a posture sensor 430, a seatbelt sensor 432, a parking brake 434 (e.g., a parking brake sensor 434), a lighting system 450, a tire pressure monitoring system (TPMS) 448, one or more cameras 446, an alert system 440, a user interface 438, a human machine interface (HMI) 436, and a telematics system 452.

Still referring to FIG. 9, controller 422 is shown to include processing circuitry 424 having a processor 426 and memory 428. Processor 426 can be implemented as a general purpose processor, an application specific integrated circuit (ASIC), one or more field programmable gate arrays (FPGAs), a group of processing components, or other suitable electronic processing components.

Memory 428 (e.g., memory device, memory unit, storage device, etc.) may include one or more devices (e.g., RAM, ROM, Flash memory, hard disk storage, etc.) for storing data and/or computer code for completing or facilitating the various processes, layers and modules described herein. Memory 428 may include volatile memory or non-volatile memory. Memory 428 may include database components, object code components, script components, or any other type of information structure for supporting the various activities and information structures described herein.

In some embodiments, the refuse vehicle 10 may include a pair of mirrors, each mirror positioned on an exterior of the refuse vehicle 10 (e.g., proximate the cab 18) and viewable from an interior of the cab 18. In some embodiments, a camera (e.g., one of the cameras 446) is positioned within the cab 18 and the controller 422 is configured to use image data from the camera to determine a position of the driver within the cab 18. In other embodiments, various sensors (e.g., weight sensors, proximity sensors, etc.) are positioned throughout the cab 18 to determine the position of the driver within the cab 18. In some embodiments, the controller 422 is configured to adjust an orientation or position of the mirrors between one or more predetermined orientations or positions based on the position of the driver within the cab 18. For example, when the driver is in a driver's seat, the mirrors can automatically transition into a first predetermined orientation. When the driver moves to a different location within the cab 18, the mirrors can automatically transition into a second predetermined orientation.

In an exemplary embodiment, the refuse vehicle 10 is limited to a predetermined speed when a driver is standing (e.g., by the controller 422). The controller 422 can obtain a driver posture from the posture sensor 430, indicating whether or not the driver is standing (e.g., when the driver is in the cab 18). The posture sensor 430 may be implemented in a variety of ways. For example, as shown in diagram 600 of FIG. 11, the posture sensor 430 may be positioned within a floor mat 610 of the cab 18 of the refuse vehicle 10 as a contact or weight sensor 612 to detect if weight applied indicates the driver is standing. If the driver is standing, the controller 422 may limit the refuse vehicle 10 to the predetermined speed (e.g., 10 mph, 20 mph, etc.) so that the refuse vehicle 10 does not travel faster than the predetermined speed. In some embodiments, the posture sensor 430 is implemented as a throttle sensor 614 of an accelerator pedal 608 of the refuse vehicle 10. The throttle sensor 614 can indicate or detect that the driver is standing or seated. The posture sensor 430 can also be implemented as a seat occupancy sensor 604 positioned within a seat cushion.

Referring to FIGS. 9 and 11, travel or movement of the refuse vehicle 10 can be limited or prevented if driver's seat belt is not latched (e.g., a safety system). The controller 422 can obtain a status of the driver's seatbelt from the seatbelt sensor 432 and limit travel or movement of the refuse vehicle 10 base on the status. The seatbelt sensor 432 is shown as seatbelt sensor 606 in FIG. 11 and is configured to monitor the status of the driver's seatbelt (e.g., when the driver's seatbelt is latched or unlatched). The controller 422 can also obtain sensor data from the seat occupancy sensor 604 (e.g., a weight sensor, a strain gauge, etc.). The controller 422 can use sensor data obtained from the seatbelt sensor 606 or 432 in combination with sensor data obtained from the seat occupancy sensor 604 to determine if the driver is seated and a status of the seat belt latch (e.g., latched or unlatched). If it is detected that the driver is seated, and the seat belt is unlatched, travel of movement of the refuse vehicle 10 may be prevented or restricted by the controller 422. In response to a detection of failure of the seat belt sensor 606, travel or movement of the vehicle may be allowed through a system override (e.g., provided by a user entering proper credentials via the user interface 438). Notification of the system override can be sent to dispatch and monitored through the telematics system 452 to prevent habitual bypass of the safety system, while still provisioning for potential seat belt latch sensor failure.

Referring to FIGS. 9 and 11, the controller 422 can be configured to use the status of the driver's seatbelt as obtained by the seatbelt sensor 432 (shown as seatbelt sensor 606 in FIG. 11) to limit vehicle body operations of the refuse vehicle 10 (e.g., operation of the lift arms 32, a loading apparatus or system of the refuse vehicle 10, etc.). The vehicle body operation can be limitable based on the status indicating that the driver's seatbelt is not latched and based on approved use by a fleet manager 454. For example, a customer may select from a menu various items or body operations that the driver or operator should have control of with or without the seat belt latched. The controller 422 may use the seat belt sensor 606 and the seat occupancy sensor 604 to confirm that the driver is sitting in seat 602 and that the driver's seatbelt is latched. The controller 422 can then allow operation of various body functions that are limited when the driver is not sitting in seat 602 and/or when the driver's seatbelt is not latched. Similarly as discussed above, the functions of controller 422 to limit or prevent body operations of the refuse vehicle 10 can be over-rideable if the seat occupancy sensor 604 or the seatbelt sensor 606 fail. Notification of a system override may be sent to dispatch (e.g., by the controller 422, or a communications system thereof) and monitored through the telematics system 452 to prevent habitual bypass and overriding, while still provisioning for potential sensor failure.

In some embodiments, the controller 422 is configured to operate the alert system 440 to notify the driver if the driver's seatbelt is unlatched while the refuse vehicle 10 is in motion. For example, the controller 422 can monitor the status provided by the seatbelt sensor 432 and a speed of the refuse vehicle 10. If the speed of the refuse vehicle 10 is greater than zero, and the seatbelt sensor 432 indicates that the driver's seatbelt is not latched, the controller 422 may operate the alert system 440 to provide an alert to the driver to fasten their seatbelt.

Referring to FIGS. 9 and 11, the controller 422 can include or perform software that performs diagnostics to detect tampering with safety equipment (e.g., the seatbelt sensor 606, the seat occupancy sensor 604, the throttle sensor 614, the contact or weight sensor 612, safety equipment anywhere on the refuse vehicle 10, etc.). For example, a washer may be taped or attached over a proximity sensor. The software of the controller 422 may detect continued request for operation of a device without seeing a state change of the proximity sensor, thereby indicating that the device can continue to be used but that the proximity sensor has been defeated. In some embodiments, the controller 422 is configured to monitor the status of the driver's seatbelt as provided by the seatbelt sensor 432 and provide seatbelt use data to dispatch or the fleet manager 454 via the telematics system 452 for coaching purposes. It should be understood that the diagnostics may be performed by the controller 422 for any safety equipment on the refuse vehicle (e.g., a proximity sensor on a door of a body of the refuse vehicle 10).

In some embodiments, the controller 422 is configured to operate a horn of the alert system 440 if a door of the refuse vehicle 10 is opened while the status from the parking brake 434 indicates that the parking brake 434 is not engaged.

In some embodiments, the controller 422 of the refuse vehicle 10 is configured to communicate wirelessly via BLUETOOTH communications through a wireless transceiver 442. The controller 422 can communicate with a personal computer device 444 via BLUETOOTH communications. In some embodiments, communication between the controller 422 and the personal computer device 444 is limited when the refuse vehicle 10 is in motion. In some embodiments, the controller 422 allows limited access or communication between the personal computer device 444 and the controller 422 based on a current operating state of the refuse vehicle 10. For example, BLUETOOTH communication may be suspended during a collection process of the refuse vehicle 10 or during vehicle motion. In some embodiments, the BLUETOOTH communication allowances or restrictions based on the current operating state of the refuse vehicle are configured by the fleet manager 454 and provided to the controller 422.

In some embodiments, the controller 422 is configured to operate the user interface 438 to provide the real-time image data obtained from the cameras 446 or to provide the real-time image data of the cameras 446 to a secondary display. In some embodiments, the user interface 438 or the secondary display is positioned within the cab 18 such that the user interface 438 is viewable from any driving position within the cab 18.

In some embodiments, the cameras 446 can be backup cameras, hopper cameras, body cameras, etc. In some embodiments, the controller 422 is configured to operate the user interface 438 or a display screen to provide real-time image data to the driver. In some embodiments, the image data displayed on the user interface 438 or on the display screen includes trajectory projections and/or distance markers (e.g., backup trajectory projections, lifting apparatus or reach arm trajectory projections, etc.). For example, the distance markers can indicate how far a collection bin is from the refuse vehicle 10.

Figure 12:
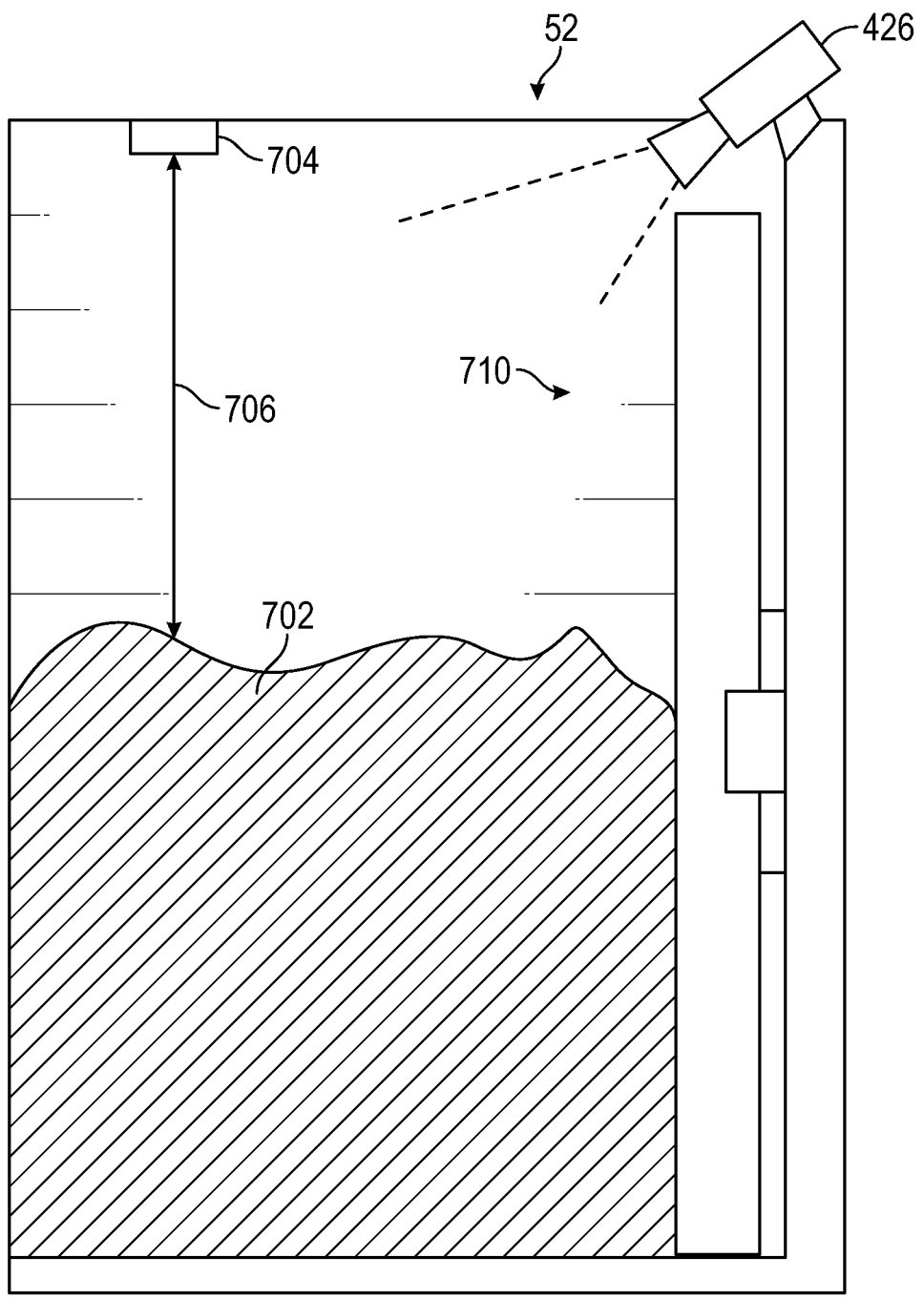
FIG. 12 is a side view of a hopper of any of the refuse vehicles of FIGS. 1-4 and 8 including a camera and a proximity sensor, according to an exemplary embodiment.

Referring to FIGS. 9 and 12, the refuse vehicle 10 may include a camera 446 positioned at the collection chamber 28 (FIG. 1), or more specifically, at a hopper 52 of the refuse vehicle 10. The camera 446 can be configured to monitor the hopper of the refuse vehicle 10 and can be one of the cameras 446. The camera 446 can provide image data of the hopper to the controller 422 so that the controller 422 may monitor a level of refuse in the collection chamber 28. The controller 422 can also operate a display or the user interface 438 of the refuse vehicle to provide real-time image data obtained by the camera 446 to a driver. The refuse vehicle also includes a proximity sensor 704 positioned at an upper portion or top of the collection chamber 28. The proximity sensor 704 can be configured to measure a distance 706 between the top of the collection chamber 28 and a level of refuse 702 in the collection chamber 28. The distance 706 can indicate how much refuse 702 is present in the hopper of the collection chamber 28. The proximity sensor 704 can provide measurements of the distance 706 or an indication of the level of the refuse 702 in the hopper of the collection chamber 28 to the controller 422. The controller 422 can use sensor data obtained from the proximity sensor 704 to determine a fill level of refuse 702 in the hopper of the collection chamber 28. Once the fill level reaches a certain level, the controller 422 may automatically initiate operation of a compaction apparatus 710 to compact or move the refuse 702 in the hopper of the collection chamber 28. In some embodiments, initiating the compaction apparatus 710 in response to sensor data from the proximity sensor 704 can facilitate initiation of the compaction apparatus 710 on demand. Initiating the compaction apparatus 710 on demand may reduce power consumption of the refuse vehicle 10.

Simplified Operations

Referring to FIG. 9, the refuse vehicle 10 can have an automatic reverse operation, facilitated by the control system 420. In some embodiments, the refuse vehicle 10 is limited to a maximum speed when travelling in reverse (e.g., 3 mph). In some embodiments, the maximum speed is set by the fleet manager 454 and provided to the controller 422 (e.g., via the telematics system 452, or other wireless communications). In some embodiments, when the refuse vehicle is put in reverse, the controller 422 is configured to operate the lighting system 450 so that one or more hazard lights are automatically illuminated or operated when the refuse vehicle 10 is put in reverse. In some embodiments, the activation of the hazard lights of the lighting system 450 (e.g., which hazard lights are activated, etc.) are determined or set by the fleet manager 454. The fleet manager 454 may provide an activation schema or rules for the lighting system 450 as configuration data to the controller 422 via the telematics system 452, or any other wireless communication of the controller 422 or the refuse vehicle 10. In some embodiments, the refuse vehicle 10 has a time delay between selection of the reverse gear and movement or travel of the refuse vehicle 10. For example, the refuse vehicle 10 may have a 3 second delay between selection of reverse gear and vehicle movement, or any other time amount (e.g., as determined or set by the fleet manager 454). The time delay may provide time for the driver to properly assess surroundings of the refuse vehicle 10. In some embodiments, the time delay is set or determined by the fleet manager 454.

In some embodiments, a horn of the refuse vehicle 10 may be operated for a predetermined amount of time when the refuse vehicle is put in reverse. For example, the controller 422 may detect transitioning of the refuse vehicle 10 into the reverse gear and operate a horn of the alert system 440 for a predetermined amount of time (e.g., half a second). In some embodiments, the amount of time that the horn is operated is set or configurable by the fleet manager 454. In some embodiments, operation of the horn of the alert system 440 when the refuse vehicle 10 is placed in reverse may occur based on times of day. For example, the horn may be prevented from being operated during nighttime in order to prevent the refuse vehicle 10 from waking residents of nearby buildings. In some embodiments, the horn is only operated when the refuse vehicle 10 is put in reverse during day-time or business hours, or at specific times of day. The hours of the day that the horn is operated when the refuse vehicle 10 is put in reverse, and when the horn is not operated when the refuse vehicle 10 is put in reverse may be determined or set by the fleet manager 454 (e.g., provided to the controller 422 by the fleet manager 454).

Referring still to FIG. 9, the controller 422 is configured to monitor a status of the parking brake 434. In some embodiments, the parking brake 434 is configured to provide its status (e.g., engaged or disengaged) to the controller 422 in real-time. In some embodiments, control system 420 (e.g., the controller 422) is configured to transition a transmission of the refuse vehicle 10 into a neutral gear (e.g., a neutral mode) when the parking brake 434 is engaged (e.g., when the status of the parking brake 434 indicates that the parking brake 434 has been activated or engaged by the driver).

Daily Vehicle Inspection Report

Referring still to FIG. 9, the controller 422 can obtain data from the TPMS 448. The controller 422 can use to data to generate an automated vehicle inspection report, or may transfer the data obtained from the TPMS 448 to the automated vehicle inspection report. The data obtained from the TPMS 448 may include tire pressure data of any wheels or tires of the refuse vehicle 10 (e.g., wheels 21). In some embodiments, the pressure of the wheels 21 of the refuse vehicle 10 is tracked in real-time, and can be analyzed (e.g., by the controller 422) to detect or identify trends. The trends can be used (e.g., by the controller 422) to predict potential failure of the wheels 21 such as tire blowouts or flats.

In some embodiments, the controller 422 or the control system 420 is configured to perform an automated light system check of the lighting system 450. For example, the controller 422 can measure current provided to different lights of the lighting system 450 and determine an operational status of the lights of the lighting system 450. In this way, the controller 422 may identify faulty or malfunctioning lights of the lighting system 450.

The controller 422 or the control system 420 of the refuse vehicle 10 can perform the real-time tracking of the TPMS 448 and the automated light system check of lighting system 450 as part of a daily vehicle inspection report. The report may be provided to an external or remote system (e.g., a fleet management system, the fleet manager 454, etc.).

Lock Out Tag Out (LOTO)

Referring to FIGS. 8-9, the refuse vehicle 10 can include wheel chocks. In some embodiments, the cab 18 includes a dedicated location for a Lock Out Tag Out (LOTO) lock to ensure that the refuse vehicle 10 is properly shut off. In some embodiments, the refuse vehicle 10 includes a lockable battery disconnect located in an accessible location. In some embodiments, any hydraulic component of the refuse vehicle 10 (e.g., lift arm actuators 42, 308, articulation actuators, etc.) a valve or outlet for releasing pressure as part of a lockout/tagout procedure. For example, the controller 422 may operate the lift assembly 30 so that the lift arms 32 are at a lowest position and then release hydraulic pressure as a part of a LOTO process.

Operator Efficiencies

Referring particularly to FIG. 9, the controller 422 can be configured to monitor a position of the refuse vehicle 10 along a route (e.g., using the telematics system 452, a global positioning system (GPS), etc.). The route may include different stops for refuse collection (e.g., different locations such as residential homes, businesses, etc. where refuse is collected). In some embodiments, the controller 422 includes a list of all stops along a route and is configured to monitor a location of the refuse vehicle 10 and operation of a collection apparatus of the refuse vehicle 10. The controller 422 can also monitor image data obtained by the cameras 446 of a hopper of the refuse vehicle 10. The controller 422 can use the collected sensor data and position to determine when refuse collection has occurred at each stop. Once refuse collection has occurred at each stop, the controller 422 may mark the stop as completed. The controller 422 can track the list and mark different stops as completed automatically (e.g., based on sensor data and monitoring operation of the refuse vehicle 10) and/or manually (e.g., in response to the driver marking that the stop has been completed). The list can be updated by the controller 422 when a stop is completed and can be transmitted to the fleet manager 454, or a fleet management system for tracking of the refuse vehicle 10.

Transmission Selections

Referring particularly to FIGS. 9 and 10, the HMI 436 of the refuse vehicle 10 can include a joystick 500 for operating the collection apparatus (e.g., the lift assembly 30, the lift assembly 301, etc.). The joystick 500 can include a base 502 and a stick 504 that is pivotally coupled with the base 502. Rotation of the stick 504 relative to the base 502 in different directions (e.g., about different axes) can generate different control signals which are provided to the controller 422 and used for operation of the collection apparatus (e.g., the lift assembly 30, the lift assembly 301, etc.). The stick includes buttons, shown as selectors 506-512. The selectors 506-512 can be pressed by the driver or operator to transition the transmission of the refuse vehicle 10 between different gears. For example, pressing selector 506 may transition the refuse vehicle 10 (or transmission thereof) into a park or stop gear. Pressing selector 508 may transition the refuse vehicle 10 (or transmission thereof) into a reverse gear. Pressing selector 510 may transition the refuse vehicle 10 (or transmission thereof) into a neutral gear. Pressing selector 512 may transition the refuse vehicle 10 (or transmission thereof) into a drive gear. Advantageously, selectors 506-512 facilitate transition of the transmission between various gears or modes, without requiring the operator to remove their hand from the joystick 500 (e.g., while operating the collection apparatus).

Hydrostatic Drive Operation

Referring to FIGS. 9 and 11, the control system 420 of the refuse vehicle 10 can be configured to control a drive operation (e.g., a hydrostatic drive operation, a drive operation that mimics functionality or operation of a hydrostatic drive operation, etc.) of the refuse vehicle 10. For example, the controller 422 may receive an input from the accelerator pedal 608, or from another accelerator pedal of the refuse vehicle 10. The drive operation may adjust movement of the refuse vehicle 10 during a collection process. Applying force to the accelerator pedal 608 can cause an increase in speed of the refuse vehicle 10. Removing force from the accelerator pedal 608 can cause a decrease in speed of the refuse vehicle 10 (e.g., slowing the vehicle). In some embodiments, removing force from the accelerator pedal 608 (e.g., when the driver removes their foot completely) results in the refuse vehicle 10 stopping (e.g., by operation of a brake system of the refuse vehicle 10 by the controller 422) without application or activation of service brakes. In some embodiments, service brakes are available or automatically used by the controller 422 to increase a deceleration rate of the refuse vehicle 10. In some embodiments, the refuse vehicle 10 includes a regenerative braking system configured to slow the refuse vehicle 10 when force is removed from the accelerator pedal 608. The drive operation can be achieved to simulate a hydrostatic drive operation using battery power (e.g., if the refuse vehicle 10 is a battery powered vehicle), and/or an engine and transmission.

Light System Check

Referring to FIG. 9, the control system 420 can be configured to perform a light system check feature for the lighting system 450. The controller 422 can prompt the driver or operator the refuse vehicle 10 to actuate controls (e.g., at the user interface 438 or the HMI 436) to activate or deactivate lights of the lighting system 450 of the refuse vehicle 10. The controller 422 may monitor inputs to the lighting system to identify if the lights of the lighting system 450 are operating properly. The control system 420 can cycle through all different lights or lighting functions of the lighting system 450, at given time intervals, to allow the driver to walk around the refuse vehicle 10 and confirm that the lights of the lighting system 450 are operating properly.

Can Collection

Referring to FIGS. 9 and 10, the joystick 500 can include a can button 514 that is configured to allow confirmation of can collection and/or whether the can cannot be collected. Pressing the can button 514 can cause the controller 422 to automatically send vehicle location data, date, time, can status (e.g., a status of a collection arm of the refuse vehicle 10, etc.), a photo of collection, etc. to a customer's software solution (e.g., via the telematics system 452 and/or any other wireless communications system of the refuse vehicle 10). Advantageously, providing the can button 514 on the joystick 500 facilitates reporting or confirmation of collection of a refuse collection bin or can at the joystick 500 without requiring the driver or operator to take their eyes off of the collection process or remove their hand from the joystick 500.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse truck as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle comprising:
a chassis;
an energy storage device supported by the chassis and configured to provide electrical power to a prime mover, wherein activation of the prime mover selectively drives the refuse vehicle;
a body assembly supported by the chassis;
a lifting system configured to engage and lift a refuse can to deposit refuse from the refuse can into the body assembly;
a power distribution unit coupled to the energy storage device and configured to control power transmission outward from the energy storage device;
wherein the body assembly includes a controller communicating with the power distribution unit to adjust a flow of electrical power from the energy storage device to the body assembly; and
a can alignment sensor in communication with the controller and configured to monitor a position of the refuse can, wherein the controller is configured to operate the prime mover in response to receiving an indication that the refuse can is outside of a target zone relative to the body assembly.

2. The refuse vehicle of claim 1, further comprising an electric power take-off, wherein the electric power take-off includes a hydraulic pump and an electric motor, wherein the electric motor is configured to receive electrical power from the energy storage device to drive the hydraulic pump to convert electrical power into hydraulic power.

3. The refuse vehicle of claim 1, wherein the energy storage device is a first battery assembly, wherein the body assembly includes a second battery assembly independent from the first battery assembly, and wherein the controller is configured to supply electrical power from the second battery assembly to at least one motor on the body assembly when the first battery assembly is disconnected from the body assembly.

4. The refuse vehicle of claim 3, wherein the second battery assembly is configured to supply DC electrical power to an inverter, and wherein the inverter is configured to supply AC electrical power to the at least one motor on the body assembly.

5. The refuse vehicle of claim 1, wherein the lifting system includes at least two forks, and wherein the at least two forks include a laser alignment system configured to project laser light along a direction aligned with the at least two forks to indicate a current position of the at least two forks.

6. The refuse vehicle of claim 1, further comprising a global positioning system configured to detect a position of the refuse vehicle, wherein the global positioning system is in communication with the controller and the controller is configured to adjust the flow of electrical power from the energy storage device to the body assembly in response to receiving an indication from the global positioning system that the refuse vehicle is located in a known location.

7. The refuse vehicle of claim 6, wherein the known location is associated with an increased travel speed, and wherein the flow of electrical power from the energy storage device to the body assembly is reduced and a flow of electrical power from the energy storage device to the prime mover is increased in response to receiving the indication that the refuse vehicle is located in the known location.

8. The refuse vehicle of claim 1, further comprising a vehicle range extender coupled to the body assembly, wherein the vehicle range extender includes a turbine generator configured to supply electrical power from the body assembly to the prime mover to drive the refuse vehicle.

9. The refuse vehicle of claim 1, wherein the controller is configured to adjust at least one operational parameter of the refuse vehicle in response to detecting an operator identity within the refuse vehicle, and wherein the at least one operational parameter is adjusted based upon a known experience level of the operator associated with the operator identity.

10. The refuse vehicle of claim 1, wherein the body assembly includes a sensor configured to measure at least one of a volume or mass of refuse received within the body assembly and, in response to detecting that at least one of the volume or mass of refuse received within the body assembly exceeds a threshold value, initiate a compactor stroke to compact the refuse received within the body assembly.

11. A refuse vehicle comprising:
a chassis;
an energy storage device supported by the chassis and configured to provide electrical power to a prime mover, wherein activation of the prime mover selectively drives the refuse vehicle;
a body assembly for storing refuse therein supported by the chassis, the body assembly including a plurality of actuators including a first actuator and a second actuator;
a global positioning system configured to detect a position of the refuse vehicle; and
a controller operatively coupled to the global positioning system and configured to adjust a flow of electrical power from the energy storage device to the body assembly to autonomously perform a sequence of predetermined operations of the actuators in response to receiving an indication from the global positioning system that the refuse vehicle is located in a predetermined location, the sequence of predetermined operations comprising a first predetermined operation of the first actuator and a second predetermined operation of the second actuator.

12. The refuse vehicle of claim 11, further comprising a power distribution unit coupled to the energy storage device and configured to control power transmission outward from the energy storage device, wherein the controller is configured to communicate with the power distribution unit to adjust the flow of electrical power from the energy storage device to the body assembly.

13. The refuse vehicle of claim 11, wherein the controller is configured to adjust the flow of the electrical power from the energy storage device to the body assembly to autonomously perform the sequence of predetermined operations of the actuators in response to receiving an indication from the global positioning system that the refuse vehicle has entered the predetermined location while traveling in reverse.

14. The refuse vehicle of claim 11, wherein the sequence of predetermined operations of the actuators is an ejection cycle to remove the refuse from the body assembly.

* * * * *